US011305832B2

(12) United States Patent
Terada et al.

(10) Patent No.: US 11,305,832 B2
(45) Date of Patent: Apr. 19, 2022

(54) LEANING VEHICLE

(71) Applicant: YAMAHA HATSUDOKI KABUSHIKI KAISHA, Iwata (JP)

(72) Inventors: Keisuke Terada, Iwata (JP); Kotaro Ogura, Iwata (JP); Hiroyuki Morita, Iwata (JP); Yosuke Hirayama, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 133 days.

(21) Appl. No.: 16/784,909

(22) Filed: Feb. 7, 2020

(65) Prior Publication Data

US 2020/0172192 A1 Jun. 4, 2020

Related U.S. Application Data

(63) Continuation of application No. PCT/JP2017/029214, filed on Aug. 10, 2017.

(51) Int. Cl.
*B62K 5/10* (2013.01)
*B62K 5/007* (2013.01)
(Continued)

(52) U.S. Cl.
CPC ............... *B62K 5/10* (2013.01); *B62K 5/007* (2013.01); *B62K 5/05* (2013.01); *B62K 5/08* (2013.01);
(Continued)

(58) Field of Classification Search
CPC . B62K 5/10; B62K 5/007; B62K 5/05; B62K 5/08; B62K 21/00; B62K 2005/001; B62K 2202/00
See application file for complete search history.

(56) References Cited

U.S. PATENT DOCUMENTS 10,696,326 B2 * 6/2020 Takenaka ............ B60G 17/0162
10,875,597 B2 * 12/2020 Mizuno .................... B62K 5/10
(Continued)

FOREIGN PATENT DOCUMENTS

CN 100400356 C * 7/2008 ............. B62D 5/008
JP 2014-524864 A 9/2014
(Continued)

OTHER PUBLICATIONS

Drew, Benjamin et al.,"System Development for Hydraulic Tilt Actuation of a Tilting Narrow Vehicle", The Ninth Scandinavian International Conference on Fluid Power, Linkoeping Universitet, Institute of Technology, [online], Jun. 2005, [retrieval date Sep. 1, 2017].
(Continued)

*Primary Examiner* — Darlene P Condra
(74) *Attorney, Agent, or Firm* — Rabin & Berdo, P.C.

(57) ABSTRACT

A left suspension unit supports a left wheel. A right suspension unit supports a right wheel. A steering actuator imparts a force causing the left suspension unit and the right suspension unit to turn about a left steering axis and a right steering axis respectively to a steering force transmission mechanism. A leaning actuator imparts a force causing a body frame to lean leftward or rightward of a leaning vehicle to a link mechanism. A control unit is capable of selecting a first mode wherein both of the steering actuator and the leaning actuator are employed, and a second mode wherein the steering actuator is employed without employing the leaning actuator, in order to control a leaning angle of the body frame in cooperation with a steering mechanism.

15 Claims, 11 Drawing Sheets

(51) Int. Cl.
  *B62K 5/05*   (2013.01)
  *B62K 5/08*   (2006.01)
  *B62K 21/00*  (2006.01)
  *B62K 5/00*   (2013.01)

(52) U.S. Cl.
  CPC ........ *B62K 21/00* (2013.01); *B62K 2005/001* (2013.01); *B62K 2202/00* (2013.01)

(56) References Cited

U.S. PATENT DOCUMENTS

| | | | | |
|---|---|---|---|---|
| 11,014,422 | B2* | 5/2021 | Hara | G05D 1/0891 |
| 2008/0290618 | A1* | 11/2008 | Yanaka | B60G 17/0195 |
| | | | | 280/6.15 |
| 2010/0044977 | A1* | 2/2010 | Hughes | B60G 21/007 |
| | | | | 280/5.509 |
| 2013/0304318 | A1* | 11/2013 | Hayashi | B62D 9/04 |
| | | | | 701/37 |
| 2014/0312580 | A1 | 10/2014 | Gale | |
| 2015/0329165 | A1* | 11/2015 | Page | B62K 21/20 |
| | | | | 280/266 |
| 2016/0251051 | A1* | 9/2016 | Malphettes | B60G 3/20 |
| | | | | 280/788 |
| 2016/0280307 | A1 | 9/2016 | Takenaka et al. | |
| 2017/0291637 | A1 | 10/2017 | Horiguchi et al. | |
| 2018/0257706 | A1* | 9/2018 | Kanehara | B62K 5/027 |
| 2018/0257728 | A1* | 9/2018 | Kanehara | B62K 21/18 |
| 2018/0265117 | A1 | 9/2018 | Hara et al. | |
| 2018/0265156 | A1* | 9/2018 | Hara | B62K 5/027 |

FOREIGN PATENT DOCUMENTS

| | | |
|---|---|---|
| JP | 2016-165986 A | 9/2016 |
| JP | 2016-179710 A | 10/2016 |
| WO | 2013005007 A1 | 1/2013 |
| WO | 2014/207489 A1 | 12/2014 |
| WO | 2017/086403 A1 | 5/2017 |
| WO | WO-2018181750 A1 * 10/2018 ............... B62K 5/01 |

OTHER PUBLICATIONS

Hirose, Noriaki et al., "Proposal of motion model around roll axis and posture stabilization control for personal mobility with leaning mechanism", Transactions of the Japan Society of Mechanical Engineers, vol. 81, No. 826, pp. 1-12, May 22, 2015.

Mourad, Lama et al.,"Direct and Steering Tilt Robust Control of Narrow Vehicles", IEEE Trans. Intell. Transp. Syst., vol. 15, No. 3, pp. 1206-1215, Jun. 2014.

Piyabongkarn, D. et al., "Active Direct Tilt Control for Stability Enhancement of a Narrow Commuter Vehicle", International Journal of Automotive Technology, vol. 5, No. 2, pp. 77-88, Jun. 2004.

\* cited by examiner ical Application PCT/JP2017/029214 having the
LEANING VEHICLE This application is a continuation under 35 U.S.C. 120 of
International Application PCT/JP2017/029214 having the
International Filing Date of Aug. 10, 2017, and being fully
incorporated herein by reference.

FIELD

The presently disclosed subject matter relates to a leaning
vehicle equipped with a leanable body frame and at least
three wheels including a left wheel and a right wheel that are
arranged side by side in a left-right direction of the body
frame.

BACKGROUND

Patent literature PTL 1 (identified further on) discloses an
example of a leaning vehicle of this type. The leaning
vehicle is equipped with the leanable body frame and the
two front wheels that are arranged side by side in the
left-right direction of the body frame. When this leaning
vehicle is leaned leftward, the two front wheels attempt to
turn counterclockwise as viewed from above the leaning
vehicle. When this leaning vehicle is leaned rightward, the
two front wheels attempt to turn clockwise as viewed from
above the leaning vehicle. This phenomenon is referred to as
self-steering. While the leaning vehicle is turning, a steering
angle is generated in the front wheels as the body frame
leans, and a state where the leaning of the body frame is
balanced with a centrifugal force generated during the
turning is maintained. When the directions of the front
wheels are changed from this balanced state, the centrifugal
force changes, whereby the leaning angle of the leaning
vehicle can be changed. This will be true with a case where
the leaning vehicle travels straight ahead.

Conditions where self-steering occurs are as follows:
(1) A steering axis of each front wheel is inclined rearwards
in a front-rear direction of the body frame relative to the
vertical direction (a caster angle is provided);
(2) A point of intersection between the steering axis of each
front wheel and a ground surface is positioned ahead of a
ground contact point of the relevant front wheel in the
front-rear direction of the body frame (a positive caster trail
is provided); and
(3) A cross-sectional shape of a ground contact portion of
each front wheel in a plane including a wheel axle of the
relevant front wheel is curved.

The leaning vehicle includes a suspension unit for supporting each front wheel. The leaning vehicle includes a
steering mechanism for turning each suspension unit around
the corresponding steering axis. The leaning vehicle
includes a steering actuator configured to impart a force to
turn each suspension unit around the corresponding steering
axis to the steering mechanism.

The leaning vehicle includes a link mechanism. The link
mechanism is configured to lean the body frame to the left
or the right by changing the relative positions of the two
front wheels to the body frame. The leaning vehicle includes
a leaning actuator configured to impart a force to lean the
body frame leftward or rightward to the link mechanism.

The leaning vehicle includes a control unit. The control
unit controls the leaning angle of the body frame in cooperation with the steering mechanism by use of both the
steering actuator and the leaning actuator. For example,
when the leaning vehicle is attempted to be leaned leftward,
the control unit causes the steering actuator to output torque
to turn the two front wheels counterclockwise and the
leaning actuator to output torque to restrain the body frame
from turning to the left. In this specification, the approach of
controlling the leaning angle of the body frame to the left or
the right by use of both the steering actuator and the leaning
actuator in the way described above is referred to as a
"cooperative control".

CITATION LIST

Patent Literature

[PTL 1] International Publication WO 2017/086403

SUMMARY

Technical Problem

The cooperative control is based on a linked operation
between the steering actuator and the leaning actuator. As a
result, the operation frequency of each of the actuators tends
to be increased. Consequently, heat is generated in the
actuators, and hence, countermeasures against the heat so
generated need to be taken.

As countermeasures to be taken, the following approaches
are considered: (1) high specifications are imparted to the
actuators; and (2) actuators configured to back up the
relevant actuators are prepared separately to deal with a case
where the relevant actuators are prevented from performing
the desired operations. However, these countermeasure
approaches both result in an increase in the space occupied
by the actuators and hence in an enlargement in size of the
vehicle body.

Consequently, in the leaning vehicle including the leanable body frame and at least three wheels including the left
front wheel and the right front wheel that are arranged side
by side in the left-right direction of the body frame, it is
required to suppress an enlargement in size of the vehicle
body while realizing a cooperative operation between the
steering actuator and the leaning actuator.

Solution to Problem

An illustrative aspect of the presently disclosed subject
matter provides a leaning vehicle comprising:
a body frame;
at least three wheels including a left wheel and a right
wheel that are arranged side by side in a left-right direction
of the body frame;
a suspension unit supporting a wheel that is included in
the three wheels and a front wheel a cross sectional shape of
which is curved; and
a steering mechanism configured to turn the suspension
unit about a steering axis,
wherein the steering axis is inclined downward in a
front-rear direction of the body frame relative to a vertical
direction;
wherein a cross point between the steering axis and a
ground is located ahead of a ground contact point of the front
wheel in the front-rear direction of the body frame;
wherein a cross sectional shape of the ground contact
point of the front wheel in a plane including an axle of the
front wheel is curved;
wherein the leaning vehicle further comprises:
  a link mechanism configured to change positions of the
    left wheel and the right wheel relative to the body frame
    to cause the body frame to lean leftward when the leaning vehicle is steered leftward and to cause the body frame to lean rightward when the leaning vehicle is steered rightward;

a steering actuator configured to impart a force causing the suspension unit to turn about the steering axis to the steering mechanism;

a leaning actuator configured to impart a force causing the body frame to lean leftward or rightward to the link mechanism; and a control unit capable of selecting a first mode in which both of the steering actuator and the leaning actuator are employed, and a second mode in which the steering actuator is employed without employing the leaning actuator, in order to control a leaning angle of the body frame in cooperation with the steering mechanism.

According to such a configuration, since an operation state where at least the leaning actuator is at rest (the second mode) can be realized, specifications required on the leaning actuator can be mitigated. Thus, an enlargement in size of the vehicle body can be suppressed while realizing the cooperative control (the first mode) between the steering actuator and the leaning actuator.

The "resting operation state" means that one of the actuators is not able to operate while a relevant mode is being selected. For example, there may be a situation where the steering actuator and the leaning actuator are not in operation while the vehicle is traveling straight ahead with the first mode selected. However, this situation where both the actuators are not in operation constitutes a so-called standby state, where the actuators are ready to operate depending upon the state of the leaning vehicle. In this situation, both the actuators are not in the "resting operation state".

The leaning vehicle may be configured such that the control unit is configured to perform a transition between the first mode and the second mode such that an output of the leaning actuator for controlling the leaning angle takes a value between a value taken before the transition and a value taken after the transition.

According to such a configuration, it is possible to not only suppress an uncomfortable feeling that would be given to the driver due to the transition between the first mode and the second mode but also to provide a smoother turning operation.

The leaning vehicle may be configured such that the control unit is configured to perform a transition between the first mode and the second mode such that an output of the leaning actuator for controlling the leaning angle takes no value between a value taken before the transition and a value taken after the transition.

According to this configuration, a smooth transition between the first mode and the second mode can be provided even when the leaning vehicle takes a quick and sharp turn. In addition, since a time required until the leaning actuator is placed in the rest state can be shortened, the consumption of electric power and the generation of heat can be suppressed further. Suppressing the consumption of electric power contributes to miniaturization of a battery to be mounted on the leaning vehicle as well as expansion of driving range.

The leaning vehicle may be configured such that the leaning actuator is implemented with a single actuator.

As a result of the specification requirements for the leaning actuator being mitigated, a leaning actuator for performing a backup operation can be made unnecessary. Accordingly, an increase in space that is occupied by the leaning actuator can be suppressed, whereby an enlargement in size of the vehicle body can be suppressed.

The leaning vehicle may be configured such that the control unit is configured to select one of the first mode and the second mode based on heat generated from the leaning actuator.

According to such a configuration, it is possible to provide a direct mode selection control that can realize better matching with the required heat countermeasures.

The leaning vehicle may be configured such that the control unit is capable of selecting, in addition to the first mode and the second mode, a third mode in which the leaning actuator is employed without employing the steering actuator.

According to such a configuration, since an operation state where the steering actuator is at rest (the third mode) can be realized, the specification requirements imposed on the steering actuator can be mitigated. Thus, an enlargement in size of the vehicle body can be suppressed while realizing the cooperative control (the first mode) between the steering actuator and the leaning actuator.

The leaning vehicle may be configured such that the control unit is configured to perform a transition between the first mode and the third mode such that an output of the steering actuator for controlling the leaning angle takes a value between a value taken before the transition and a value taken after the transition.

According to such a configuration, it is possible to not only suppress an uncomfortable feeling that would be given to the driver due to the transition between the first mode and the third mode but also to provide a smoother turning operation.

The leaning vehicle may be configured such that the control unit is configured to perform a transition between the first mode and the third mode such that an output of the steering actuator for controlling the leaning angle takes no value between a value taken before the transition and a value taken after the transition.

According to this configuration, a smooth transition between the first mode and the third mode can be provided even when the leaning vehicle takes a quick and sharp turn. In addition, since a time required until the steering actuator is placed in the rest state can be shortened, the consumption of electric power and the generation of heat can be suppressed further. Suppressing the consumption of electric power contributes to miniaturization of a battery to be mounted on the leaning vehicle as well as expansion of driving range.

The leaning vehicle may be configured such that the steering actuator is implemented with a single actuator.

As a result of the specification requirements for the steering actuator being mitigated, a steering actuator for performing a backup operation can be made unnecessary. Accordingly, an increase in space that is occupied by the leaning actuator can be suppressed, whereby an enlargement in size of the vehicle body can be suppressed.

The leaning vehicle may be configured such that the control unit is configured to select one of the first mode and the third mode based on heat generated from the steering actuator.

According to such a configuration, it is possible to provide a direct mode selection control that can realize better matching with the required heat countermeasures.

The leaning vehicle may be configured such that the control unit is configured to perform a mode transition among the first mode, the second mode, and the third mode so as to permit at least a mode transition between the first mode and the second mode, and a mode transition between the first mode and the third mode.

In this case, it is possible to realize a selective transition to the second mode or the third mode from the first mode that is referred to as a basic mode, thereby enabling suppression of an increase in a processing load of the control unit.

Preferably, the control unit may be configured to perform the mode transition among the first mode, the second mode, and the third mode so as to permit all permutations thereof.

In this case, a more flexible mode transition in accordance with the states of the steering actuator and the leaning actuator can be provided.

The leaning vehicle may be configured so as to further comprise a leaning restriction mechanism configured to restrict an operation of the link mechanism, and such that the control unit is configured to cause the leaning restriction mechanism to restrict the operation of the link mechanism while the second mode is selected.

According to this configuration, a change in posture of the body frame can be restricted when the second mode is selected in which the leaning actuator is not employed. As a result, the consumption of electric power by and the generation of heat in the leaning actuator can be suppressed, even though the posture of the body frame can easily be maintained when the leaning vehicle is traveling at low speeds, the rider walks while pushing the leaning vehicle, or the leaning vehicle is halted. Suppressing the consumption of electric power contributes to miniaturization of a battery to be mounted on the leaning vehicle as well as expansion of driving range.

The leaning vehicle may be configured such that the left wheel and the right wheel are front wheels.

In the above embodiment, the leaning vehicle includes the two front wheels. According to this configuration, the link mechanism and the leaning actuator can be disposed closer to the front end of the leaning vehicle. As a result, since the leaning actuator is easily exposed to running air, the requirement in relation to heat can be mitigated. Consequently, the necessity of employing a large leaning actuator with a large heat capacity can be suppressed, thereby suppressing the enlargement of the vehicle body.

DETAILED DESCRIPTION

Figure 1:
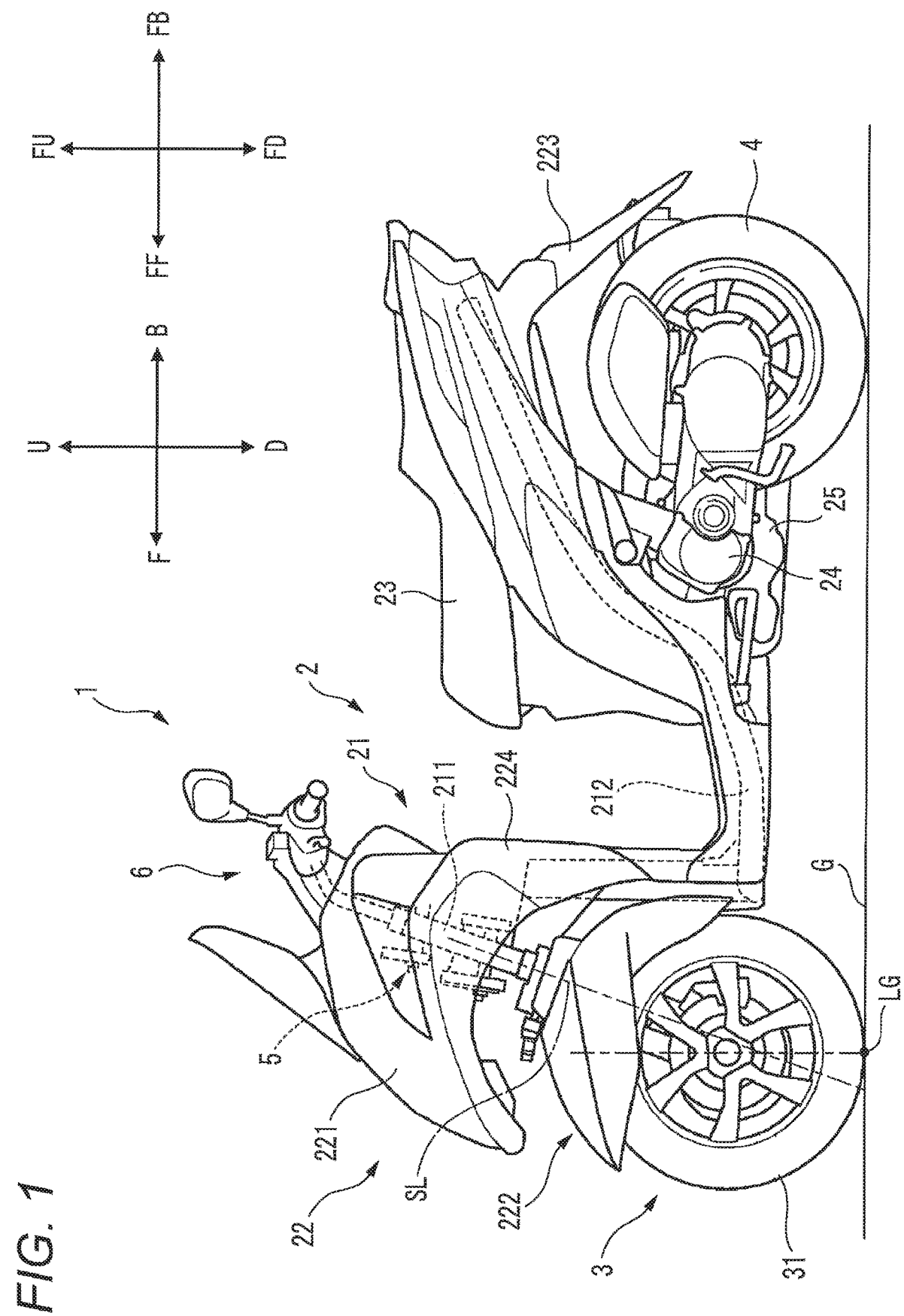
FIG. 1 is a left side view entirely illustrating a leaning vehicle according to one embodiment.

Referring to the accompanying drawings, an exemplary embodiment will be described in detail below.

In the accompanying drawings, an arrow F denotes a front or forward direction of a leaning vehicle. An arrow B denotes a back/rear or backward/rearward direction of the leaning vehicle. An arrow U denotes an up or upward direction of the leaning vehicle. An arrow D denotes a down or downward direction of the leaning vehicle. An arrow R denotes a right or rightward direction of the leaning vehicle. An arrow L denotes a left or leftward direction of the leaning vehicle.

A leaning vehicle turns with a body frame being caused to lean leftward or rightward from a vertical direction. Then, in addition to the directions based on the leaning vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" mean a front-rear direction, a left-right direction and an up-down direction based on the body frame when viewed from a rider who rides the leaning vehicle. "A side of or sideways of the body frame" means directly on the right or left in the left-right direction of the body frame.

In this description, an expression "extending in the front-rear direction of the leaning vehicle body frame" includes a fact that it extends while being inclined in relation to the front-rear direction of the leaning vehicle body frame and means that it extends in a direction closer to the front-rear direction of the leaning vehicle body frame than the left-right direction and up-down direction of the leaning vehicle body frame.

In this description, an expression "extending in the left-right direction of the leaning vehicle body frame" includes a fact that it extends while being inclined in relation to the left-right direction of the leaning vehicle body frame and means that it extends in a direction closer to the left-right direction of the leaning vehicle body frame than the front-rear direction and up-down direction of the leaning vehicle body frame.

In this description, an expression "extending in the up-down direction of the leaning vehicle body frame" includes a fact that it extends while being inclined in relation to the up-down direction of the leaning vehicle body frame and means that it extends in a direction closer to the up-down direction of the leaning vehicle body frame than the left-right direction and front-rear direction of the leaning vehicle body frame.

In this description, an expression reading the "leaning vehicle is standing upright or in an upright state" or the "body frame is standing upright or in the upright state"

means a state in which the leaning vehicle is not steered at all and the up-down direction of the body frame coincides with the vertical direction. In this state, the directions based on the leaning vehicle coincide with the directions based on the body frame. When the leaning vehicle is turning with the body frame caused to lean to the left or right from the vertical direction, the left-right direction of the leaning vehicle does not coincide with the left-right direction of the body frame. Similarly, the up-down direction of the leaning vehicle does not coincide with the up-down direction of the body frame. However, the front-rear direction of the leaning vehicle coincides with the front-rear direction of the body frame.

In this description, an expression reading "directly on the left of a member A in the left-right direction of the body frame" denotes a space through which the member A passes when the member A is translated to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is translated to the left in the left-right direction of the body frame but also a space which expands from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is translated rightward in the up-down direction of the body frame. An expression reading "directly below the member A" is also defined in the same way.

In this description, an expression reading "above the member A in the up-down direction of the body frame" includes not only the space through which the member A passes when the member A is translated rightward in the up-down direction of the body frame but also a space which expands from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is translated to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is translated to the front in the front-rear direction of the body frame but also a space which expands from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

In this description, "connected" or "coupled" specifies not only a case where one member and another member are directly connected but also a case where one member and another member are indirectly connected by way of still another member.

Referring to FIGS. 1 to 11, a leaning vehicle 1 according to an embodiment will be described. As illustrated in FIG. 1, the leaning vehicle 1 includes a vehicle main body 2, two front wheels 3, a rear wheel 4, a link mechanism 5 and a steering mechanism 6.

The vehicle main body 2 includes a body frame 21, a vehicle body cover 22, a seat 23, a power unit 24, and a rear arm 25.

In FIG. 1, the body frame 21 is in an upright state. The following description to be made while referring to FIG. 1 is based on the premise that the body frame 21 is in the upright state. FIG. 1 is a left side view in which the whole of the leaning vehicle 1 is viewed from the left in the left-right direction of the body frame 21.

The body frame 21 includes a head pipe 211 and a main frame 212.

The head pipe 211 is disposed at a front portion of the leaning vehicle 1. When seeing the leaning vehicle 1 from the left-right direction of the body frame 21, an upper portion of the head pipe 211 is disposed ahead of a lower portion of the head pipe 211 in the front-rear direction of the body frame 21.

The main frame 212 is connected to the head pipe 211. The main frame 212 is disposed behind the head pipe 211 in the front-rear direction of the body frame 21. The main frame 212 supports the seat 23, the power unit 24, and the rear arm 25.

The power unit 24 comprises a power source such as an engine, an electric motor, a battery or the like and a transmission mechanism such as a transmission. A driving force generated by the drive source is transmitted to the rear wheel 4 by way of the transmission mechanism.

The rear arm 25 extends in the front-rear direction of the body frame 21. A front end portion of the rear arm 25 is supported on the main frame 212 and is allowed to turn about an axis that extends in the left-right direction of the body frame 21. A rear end portion of the rear arm 25 supports the rear wheel 4.

The body cover 22 is a body component that at least partially covers components that makes up the leaning vehicle 1. The vehicle body cover 22 includes a front cover 221, two front fenders 222, a rear fender 223, and a leg shield 224.

The front cover 221 is disposed ahead of the seat 23 in the front-rear direction of the body frame 21. The front cover 221 covers the link mechanism 5 and at least part of the steering mechanism 6. The front cover 221 is disposed in such a manner as not to be displaced relative to the body frame 21.

At least a portion of each of the front fenders 222 is disposed directly below the front cover 221. At least a portion of each of the two front fenders 222 is disposed above a corresponding front wheel 3.

The two front wheels 3 are disposed below the head pipe 211 in an up-down direction of the body frame 21. At least portions of the two front wheels 3 are disposed directly below the front cover 221 in the up-down direction of the body frame 21.

The rear wheel 4 is at least partially disposed below the seat 23 in the up-down direction of the body frame 21. The rear wheel 4 is at least partially disposed directly below the rear front fender 223 in the up-down direction of the body frame 21.

The leg shield 224 is disposed behind the two front wheels 3 and ahead of the seat 23 in the front-rear direction of the body frame 21. The leg shield 224 is disposed in a position where the leg shield 224 at least partially covers the legs of the rider who sits on the seat 23 when viewed from the front of the leaning vehicle 1.

Figure 2:
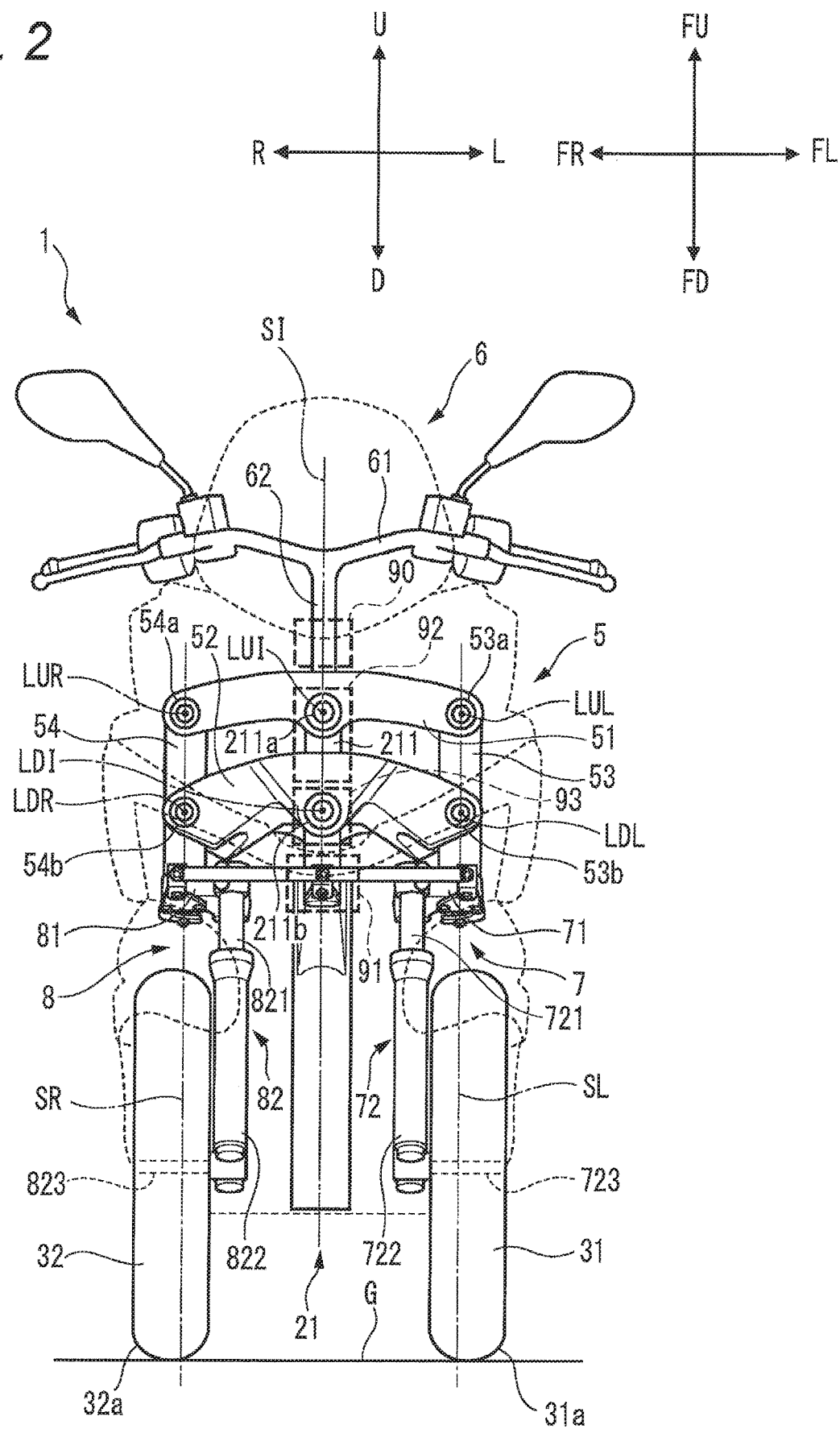
FIG. 2 is a front view illustrating a front portion of the leaning vehicle of FIG. 1.

FIG. 2 is a front view of a front portion of the leaning vehicle 1 as viewed from the front of the leaning vehicle 1 in the front-rear direction of the body frame 21. In FIG. 2, the body frame 21 is in the upright state. The following description to be made while referring to FIG. 2 is based on the premise that the body frame 21 is in the upright state. In FIG. 2, the front portion of the leaning vehicle 1 is illustrated as seen through the front cover 221, the two front fenders 222, and the leg shield 224 which are indicated by dashed lines.

The two front wheels 3 include a left wheel 31 and a right wheel 32. The left wheel 31 is disposed on the left of the head pipe 211, which constitutes part of the body frame 21, in the left-right direction of the body frame 21. The right wheel 32 is disposed on the right of the head pipe 211 in the left-right direction of the body frame 21. The left wheel 31 and the right wheel 32 are arranged side by side in the left-right direction of the body frame 21.

The two front fenders 222 include a left fender and a right fender. The left fender at least partially covers an upper face of the left wheel 31. The right fender at least partially covers an upper surface of the right wheel 32.

The steering mechanism 6 includes a handlebar 61 and a steering shaft 62. The steering shaft 62 extends downwards from an intermediate portion of the handlebar 61 in relation to the left-right direction thereof. The steering shaft 62 is supported on the head pipe 211 via an intermediate steering bearing portion (not illustrated). As a result, the steering shaft 62 can turn around an intermediate steering axis SI relative to the head pipe 211.

In the leaning vehicle 1 according to this embodiment, the link mechanism 5 adopts a parallel four-joint link (also referred to as a "parallelogram link").

The link mechanism 5 is disposed above the left wheel 31 and the right wheel 32 in the up-down direction of the body frame 21. The link mechanism 5 includes an upper cross member 51, a lower cross member 52, a left side member 53, and a right side member 54. The link mechanism 5 is not interlocked with turning of the steering shaft 62 around the intermediate steering axis SI which is triggered when the handlebar 61 is operated. That is, the link mechanism 5 does not turn around the intermediate steering axis SI relative to the body frame 21.

The head pipe 211 includes an upper intermediate leaning bearing portion 211a. An intermediate portion of the upper cross member 51 is supported on the head pipe 211 via the upper intermediate leaning bearing portion 211a. The upper cross member 51 can turn relative to the head pipe 211 around an upper intermediate leaning axis LUI that extends through the upper intermediate leaning bearing portion 211a in the front-rear direction of the body frame 21.

The head pipe 211 includes a lower intermediate bearing portion 211b. An intermediate portion of the lower cross member 52 is supported on the head pipe 211 via the lower intermediate leaning bearing portion 211b. The lower cross member 52 can turn relative to the head pipe 211 around a lower intermediate leaning axis LDI that extends through the lower intermediate leaning bearing portion 211b in the front-rear direction of the body frame 21.

The left side member 53 includes an upper left leaning bearing portion 53a. A left end portion of the upper cross member 51 is coupled to the left side member 53 via the upper left leaning bearing portion 53a. The upper cross member 51 can turn relative to the left side member 53 around an upper left leaning axis LUL that extends through the upper left leaning bearing portion 53a in the front-rear direction of the body frame 21.

The right side member 54 includes an upper right leaning bearing portion 54a. A right end portion of the upper cross member 51 is coupled to the right side member 54 via the upper right leaning bearing portion 54a. The upper cross member 51 can turn relative to the right side member 54 around an upper right leaning axis LUR that extends through the upper right leaning bearing portion 54a in the front-rear direction of the body frame 21.

The left side member 53 includes a lower left leaning bearing portion 53b. A left end portion of the lower cross member 52 is coupled to the left side member 53 via the lower left leaning bearing portion 53b. The lower cross member 52 can turn relative to the left side member 53 around a lower left leaning axis LDL that extends through the lower left leaning bearing portion 53b in the front-rear direction of the body frame 21.

The right side member 54 includes a lower right leaning bearing portion 54b. A right end portion of the lower cross member 52 is coupled to the right side member 54 via the lower right leaning bearing portion 54b. The lower cross member 52 can turn relative to the right side member 54 around a lower right leaning axis LDR that extends through the lower right leaning bearing portion 54b in the front-rear direction of the body frame 21.

Figure 3:
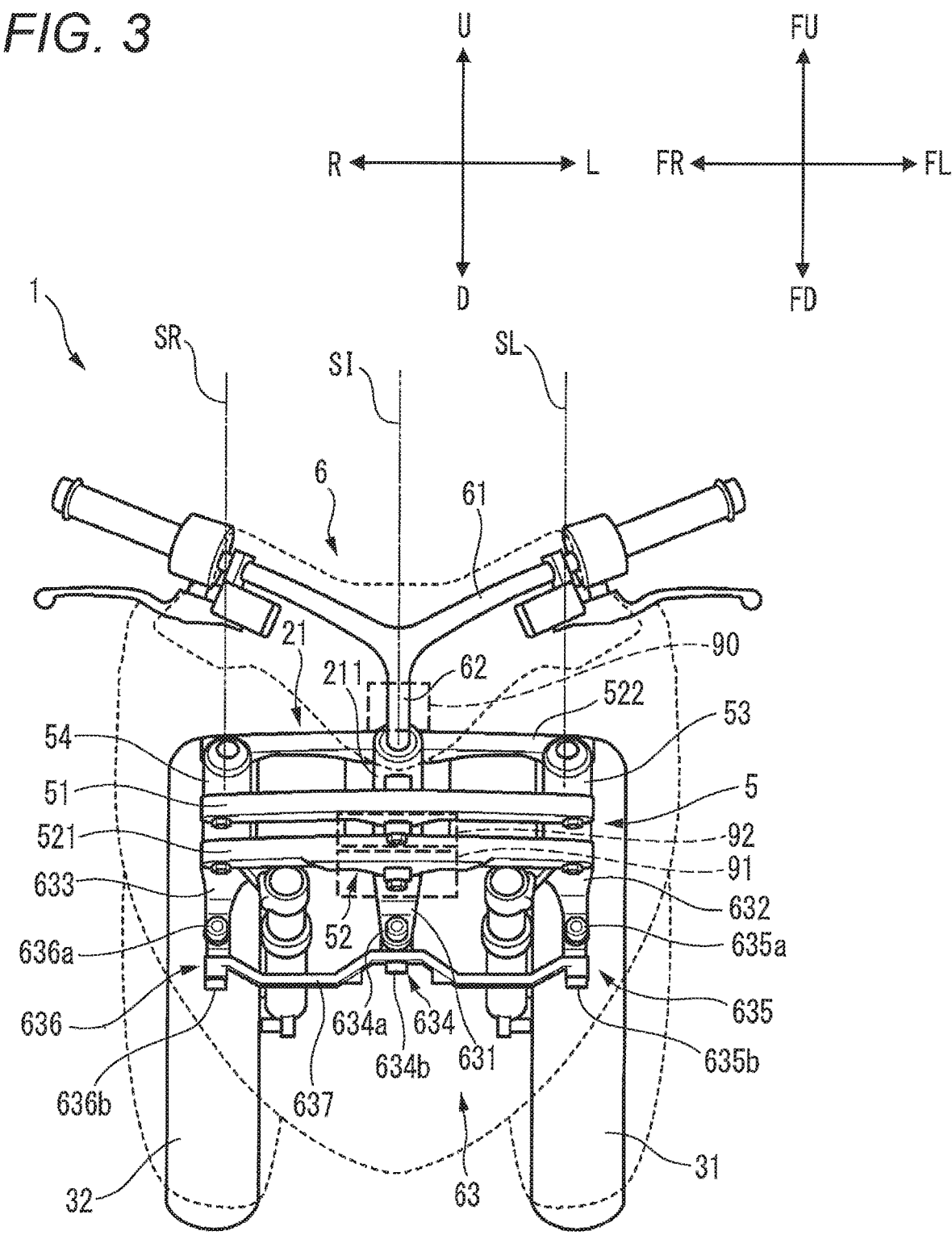
FIG. 3 is a plan view illustrating the front portion of the leaning vehicle of FIG. 1.

FIG. 3 is a plan view of the front portion of the leaning vehicle 1 as viewed from above in the up-down direction of the body frame 21. In FIG. 3, the body frame 21 is in the upright state. The following description to be made while referring to FIG. 3 is based on the premise that the body frame 21 is in the upright state. In FIG. 3, the front portion of the leaning vehicle 1 is illustrated as seen through the front cover 221 and the two front fenders 222 that are indicated by dashed lines.

The upper cross member 51 is disposed ahead of the head pipe 211 in the front-rear direction of the body frame 21. The upper cross member 51 is a plate-shaped member that extends in the left-right direction of the body frame 21 without being curved in the front-rear direction of the body frame 21.

As illustrated in FIGS. 2 and 3, the lower cross member 52 is disposed below the upper cross member 51 in the up-down direction of the body frame 21. The lower cross member 52 includes a front element 521 and a rear element 522. The front element 521 is disposed ahead of the head pipe 211, the left side member 53 and the right side member 54 in the front-rear direction of the body frame 21. The rear element 522 is disposed behind the head pipe 211, the left side member 53 and the right side member 54 in the front-rear direction of the body frame 21. The front element 521 and the rear element 522 extend in the left-right direction of the body frame 21.

As illustrated in FIGS. 2 and 3, the left side member 53 is disposed directly on the left of the head pipe 211 in the left-right direction of the body frame 21. The left side member 53 is disposed above the left wheel 31 in the up-down direction of the body frame 21. The left side member 53 extends in a direction in which the head pipe 211 extends. An upper portion of the left side member 53 is disposed behind a lower portion thereof in the front-rear direction of the body frame 21.

As illustrated in FIGS. 2 and 3, the right side member 54 is disposed directly on the right of the head pipe 211 in the left-right direction of the body frame 21. The right side member 54 is disposed above the right wheel 32 in the up-down of the body frame 21. The right side member 54 extends in the direction in which the head pipe 211 extends. An upper portion of the right side member 54 is disposed behind a lower portion thereof in the front-rear direction of the body frame 21.

The upper cross member 51, the lower cross member 52, the left side member 53 and the right side member 54 are supported on the head pipe 211 so that the upper cross member 51 and the lower cross member 52 are kept in a posture in which the upper cross member 51 and the lower cross member 52 are parallel to each other and that the left side member 53 and the right side member 54 are kept in a posture in which the left side member 53 and the right side member 54 are parallel to each other.

As illustrated in FIG. 2, the leaning vehicle 1 includes a left suspension unit 7. The left suspension unit 7 includes a left bracket 71 and a left shock absorbing device 72.

The left bracket 71 includes a left turnable member (not illustrated) at an upper portion thereof. The left turnable member is disposed in an interior of the left side member 53 and extends in the same direction as a direction in which the left side member 53 extends. The left side member 53 includes a left steering bearing portion (not illustrated). The left turnable member is supported on the left side member 53 via the left steering bearing portion. As a result, the left turnable member can turn relative to the left side member 53 around a left steering axis SL. That is, the left bracket 71 is coupled to the left side member 53 in such a manner as to turn relative to the left side member 53 around the left steering axis SL.

The left steering axis SL extends in the direction in which the left side member 53 extends. As illustrated in FIG. 2, the left steering axis SL extends parallel to the intermediate steering axis SI of the steering shaft 62 in the up-down direction of the body frame 21. As illustrated in FIG. 3, the left steering axis SL extends parallel to the intermediate steering axis SI of the steering shaft 62 in the front-rear direction of the body frame 21.

The left shock absorbing device 72 is a so-called telescopic shock absorbing mechanism. As illustrated in FIG. 2, the left shock absorbing device 72 includes a left upper telescopic element 721, a left lower telescopic element 722, and a left wheel axle 723.

The left upper telescopic element 721 is supported on the left bracket 71. The left lower telescopic element 722 is coupled to the left upper telescopic element 721 in such a manner as to slide relative to the left upper telescopic element 721. A displacement of the left wheel 31 relative to the link mechanism 5 in the up-down direction of the body frame 21 is mitigated by the left lower telescopic element 722 sliding relative to the left upper telescopic element 721.

The left wheel axle 723 is supported on the left lower telescopic element 722. The left wheel axle 723 supports the left wheel 31. The left wheel 31 can rotate around the left wheel axle 723.

As illustrated in FIG. 2, the leaning vehicle 1 includes a right suspension unit 8. The right suspension unit 8 includes a right bracket 81 and a right shock absorbing device 82.

The right bracket 81 includes a right turnable member (not illustrated) at an upper portion thereof. The right turnable member is disposed in an interior of the right side member 54 and extends in the same direction as a direction in which the right side member 54 extends. The right side member 54 includes a right steering bearing portion (not illustrated). The right turnable member is supported on the right side member 54 via the right steering bearing portion. As a result, the right turnable member can turn relative to the right side member 54 around a right steering axis SR. That is, the right bracket 81 is coupled to the right side member 54 in such a manner as to turn relative to the right side member 54 around the right steering axis SR.

The right steering axis SR extends in a direction in which the right side member 54 extends. As illustrated in FIG. 2, the right steering axis SR extends parallel to the intermediate steering axis SI of the steering shaft 62 in the up-down direction of the body frame 21. As illustrated in FIG. 3, the right steering axis SR extends parallel to the intermediate steering axis SI of the steering shaft 62 in the front-rear direction of the body frame 21.

The right shock absorbing device 82 is a so-called telescopic shock absorbing mechanism. As illustrated in FIG. 2, the right shock absorbing device 82 includes a right upper telescopic element 821, a right lower telescopic element 822, and a right wheel axle 823.

The right upper telescopic element 821 is supported on the right bracket 81. The right lower telescopic element 822 is coupled to the right upper telescopic element 821 in such a manner as to slide relative to the right upper telescopic element 821. A displacement of the right wheel 32 relative to the link mechanism 5 in the up-down direction of the body frame 21 is mitigated by the right lower telescopic element 822 sliding relative to the right upper telescopic element 821.

The right wheel axle 823 is supported on the right lower telescopic element 822. The right wheel axle 823 supports the right wheel 32. The right wheel 32 can rotate around the right wheel axle 823.

As illustrated in FIG. 1, the left steering axis SL is inclined rearwards in the front-rear direction of the body frame 21 from the vertical direction (in the up-down direction of the body frame 21), so that a caster angle is provided. Similarly, the right steering axis SR is inclined rearwards in the front-rear direction of the body frame 21 from the vertical direction (in the up-down direction of the body frame 21), so that a caster angle is provided.

As illustrated in FIG. 1, a point of intersection between the left steering axis SL and a ground surface G is positioned ahead of a ground contact point LG of the left wheel 31 in the front-rear direction of the body frame 21, so that a positive caster trail is provided. Similarly, a point of intersection between the right steering axis SR and the ground surface G is positioned ahead of a ground contact point of the right wheel 32 in the front-rear direction of the body frame 21, so that a positive caster trail is provided.

As illustrated in FIG. 2, a cross-sectional shape of a ground contact portion 31a of the left wheel 31 in a plane including the left wheel axle 723 is curved. Similarly, a cross-sectional shape of a ground contact portion 32a of the right wheel 32 in a plane including the right wheel axle 823 is curved.

Figure 4:
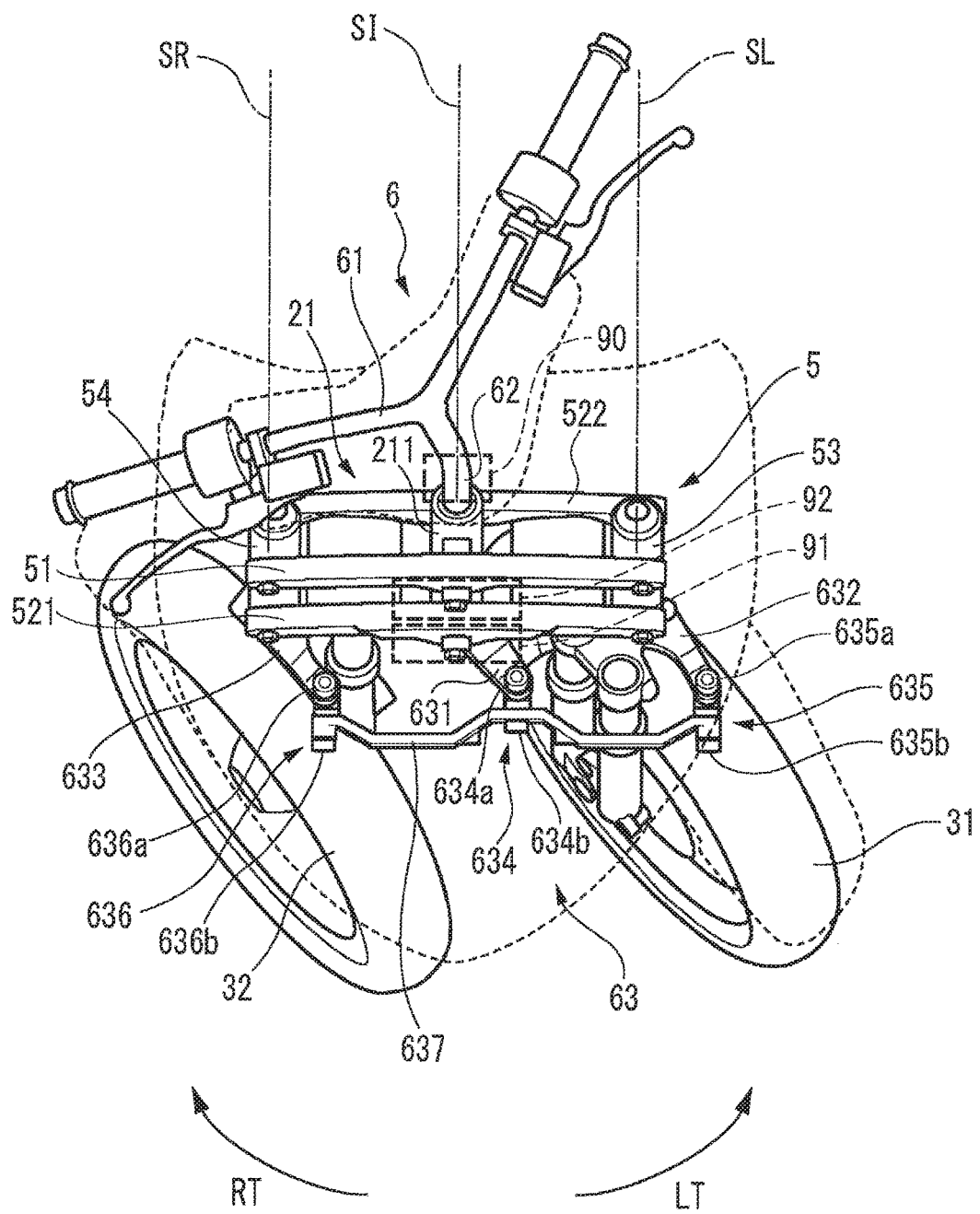
FIG. 4 is a plan view illustrating the front portion of the leaning vehicle of FIG. 1 when steering to the left is performed.
Figure 5:
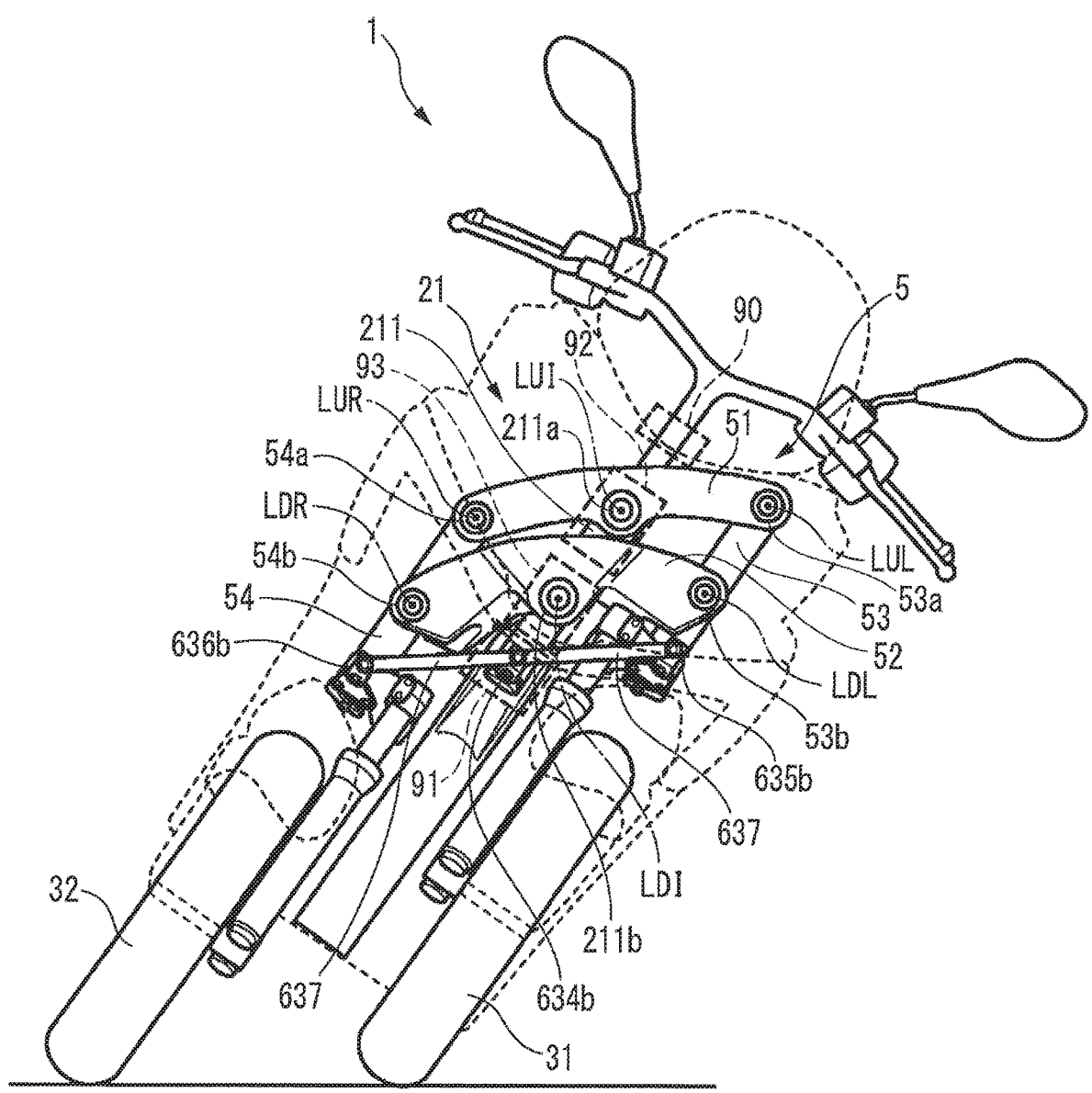
FIG. 5 is a front view illustrating the leaning vehicle of FIG. 1 when leaning to the left is performed.

That is, the leaning vehicle 1 is configured such that self-steering occurs. As illustrated in FIG. 5, when the leaning vehicle 1 is leaned leftward, the left wheel 31 and the right wheel 32 attempt to turn in a direction indicated by an arrow LT in FIG. 4 around the left steering axis SL and the right steering axis SR, respectively. On the contrary, when the leaning vehicle 1 is leaned rightward, the left wheel 31 and the right wheel 32 attempt to turn in a direction indicated by an arrow RT in FIG. 4 around the left steering axis SL and the right steering axis SR, respectively. While the leaning vehicle 1 is turning, a steering angle is generated in the left wheel 31 and the right wheel 32 as the body frame 21 leans, and a state where the leaning of the body frame 21 is balanced with a centrifugal force generated during the turning is maintained. When the directions of the left wheel 31 and the right wheel 32 are changed from this balanced state, the centrifugal force changes, whereby the leaning angle of the leaning vehicle 1 can be changed. This will be true with a case where the leaning vehicle travels straight ahead.

The leaning vehicle 1 includes a steering sensor 90. The steering sensor 90 is joined to the steering shaft 62. The steering sensor 90 detects a turning angle of the steering shaft 62 that corresponds to an operation of the handlebar 61 by a rider. Examples of the steering sensor 90a include a magnetostrictive sensor, a rotary encoder, a potentiometer, and the like.

The leaning vehicle 1 includes a control unit 93. The control unit 93 includes a processor and a memory. Examples of the processor include a CPU, an MPU, and a GPU. The processor can include a plurality of processor cores. Examples of the memory include a ROM and a RAM. The ROM stores a program for executing the operations described above. The program can include an artificial intelligent program. Examples of the artificial intelligent program include a pretrained neural network based on deep learning. The processor can designate at least part of the program stored in the ROM, deploy it on the RAM, and execute the operations described above in cooperation with the RAM. The control unit 93 may be configured as a control device such as an ECU, may be configured by an integrated circuit such as an ASIC or an FPGA, or may be configured by a combination of a microcontroller and an integrated circuit.

The control unit 93 is configured to communicate with the steering sensor 90. The steering sensor 90 inputs a signal corresponding to a turning angle of the steering shaft 62 that the steering sensor 90 detects to the control unit 93.

The leaning vehicle 1 includes a steering actuator 91. The steering actuator 91 constitutes a device for generating a force to turn the left suspension unit 7 around the left steering axis SL and a force to turn the right suspension unit 8 around the right steering axis SR. The steering actuator 91 can be implemented with an electric motor or a hydraulic motor. The steering actuator 91 is configured to communicate with the control unit 93. The control unit 93 outputs a signal causing the steering actuator 91 to perform a desired operation based on the signal that is inputted thereto from the steering sensor 90.

As illustrated in FIG. 3, the steering mechanism 6 includes a steering force transmission mechanism 63. The steering actuator 91 is mechanically joined to the steering force transmission mechanism 63. The steering actuator 91 imparts a force to turn the left suspension unit 7 around the left steering axis SL and a force to turn the right suspension unit 8 around the right steering axis SR to the steering force transmission mechanism 63 based on the signal inputted thereto from the control unit 93.

The steering force transmission mechanism 63 includes an intermediate transmission plate 631, a left transmission plate 632, a right transmission plate 633, an intermediate joint 634, a left joint 635, a right joint 636, and a tie rod 637.

The intermediate transmission plate 631 is provided at a lower portion of the steering shaft 62. The intermediate transmission plate 631 can turn relative to the head pipe 211 around a turning axis that extends parallel to the intermediate steering axis SI of the steering shaft 62.

The left transmission plate 632 is disposed directly on the left of the intermediate transmission plate 631. The left transmission plate 632 is connected to a lower portion of the left bracket 71. The left transmission plate 632 cannot turn relative to the left bracket 71. The left transmission plate 632 can turn relative to the left side member 53 around the left steering axis SL.

The right transmission plate 633 is disposed directly on the right of the intermediate transmission plate 631 in the left-right direction of the body frame 21. The right transmission plate 633 is connected to a lower portion of the right bracket 81. The right transmission plate 633 cannot turn relative to the right bracket 81. The right transmission plate 633 can turn relative to the right side member 54 around the right steering axis SR.

The intermediate joint 634 includes an intermediate joint steering bearing portion 634a. The intermediate joint steering bearing portion 634a defines an intermediate joint steering axis that extends in the up-down direction of the body frame 21. The intermediate joint 634 is coupled to a front portion of the intermediate transmission plate 631 via the intermediate joint steering bearing portion 634a. This enables the intermediate joint 634 to turn relative to the intermediate transmission plate 631 around the intermediate joint steering axis.

The left joint 635 is disposed on the left of the intermediate joint 634 in the left-right direction of the body frame 21. The left joint 635 includes a left joint steering bearing portion 635a. The left joint steering bearing portion 635a defines a left joint steering axis that extends in the up-down direction of the body frame 21. The left joint 635 is coupled to a front portion of the left transmission plate 632 via the left joint steering bearing portion 635a. This enables the left joint 635 to turn relative to the left transmission plate 632 around the left joint steering axis.

The right joint 636 is disposed on the right of the intermediate joint 634 in the left-right direction of the body frame 21. The right joint 636 includes a right joint steering bearing portion 636a. The right joint steering bearing portion 636a defines a right joint steering axis that extends in the up-down direction of the body frame 21. The right joint 636 is coupled to a front portion of the right transmission plate 633 via the right joint steering bearing portion 636a. This enables the right joint 636 to turn relative to the right transmission plate 633 around the right joint steering axis.

The intermediate joint 634 includes an intermediate joint leaning bearing portion 634b. The intermediate joint leaning bearing portion 634b defines an intermediate joint leaning axis that extends in the front-rear direction of the body frame 21. An intermediate portion of the tie rod 637 is coupled to the intermediate joint leaning bearing portion 634b. The intermediate portion of the tie rod 637 can turn relative to the intermediate joint leaning bearing portion 634b around the intermediate joint leaning axis.

The left joint 635 includes a left joint leaning bearing portion 635b. The left joint leaning bearing portion 635b defines a left joint leaning axis that extends in the front-rear direction of the body frame 21. A left portion of the tie rod 637 is coupled to the left joint leaning bearing portion 635b. The left portion of the tie rod 637 can turn relative to the left joint leaning bearing portion 635b around the left joint leaning axis.

The right joint 636 includes a right joint leaning bearing portion 636b. The right joint leaning bearing portion 636b defines a right joint leaning axis that extends in the front-rear direction of the body frame 21. A right portion of the tie rod 637 is coupled to the right joint leaning bearing portion 636b. The right portion of the tie rod 637 can turn relative to the right joint leaning bearing portion 636b about the right joint leaning axis.

The left transmission plate 632 is coupled to the intermediate transmission plate 631 via the left joint 635, the tie rod 637 and the intermediate joint 634. The right transmission plate 633 is coupled to the intermediate transmission plate 631 via the right joint 636, the tie rod 637 and the intermediate joint 634. The left transmission plate 632 and the right transmission plate 633 are coupled to each other via the left joint 635, the tie rod 637 and the right joint 636. In other words, the tie rod 637 couples the intermediate transmission plate 631 to the left transmission plate 632 and the right transmission plate 633.

Next, referring to FIG. 4, a steering operation of the leaning vehicle 1 will be described. FIG. 4 is a plan view of the front portion of the leaning vehicle 1 as viewed from above in the up-down direction of the body frame 21 with the left wheel 31 and the right wheel 32 steered to turn to the left. In FIG. 4, the body frame 21 is in the upright state. The following description to be made while referring to FIG. 4 is based on the premise that the body frame 21 is in the upright state. In FIG. 4, the front portion of the leaning vehicle 1 is illustrated as seen through the front cover 221 and the two front fenders 222 that are indicated by dashed lines.

When the rider operates the handlebar 61, the steering shaft 62 turns around the intermediate steering axis SI relative to the head pipe 211. In the case where the front wheels are steered to turn to the left as illustrated in FIG. 4, the steering shaft 62 turns in a direction indicated by an arrow LT. The turning of the steering shaft 62 in the direction indicated by the arrow LT is detected by the steering sensor 90. The steering sensor 90 inputs a signal corresponding to the detected turning of the steering shaft 60 to the control unit 93. The control unit 93 causes the steering actuator 91 to perform an operation based on the signal inputted thereto. The intermediate transmission plate 631 turns around the intermediate steering axis SI relative to the head pipe 211 in the direction indicated by the arrow LT based on the operation performed by the steering actuator 91.

The intermediate joint 634 of the tie rod 637 turns in a direction indicated by the arrow RT relative to the intermediate transmission plate 631 in association with the turning of the intermediate transmission plate 631 in the direction indicated by the arrow LT. As a result, the tie rod 637 moves to the left in the left-right direction of the body frame 21 and to the rear in the front-rear direction of the body frame 21 while maintaining its posture.

As the tie rod 637 moves in the way described above, the left joint 635 and the right joint 636 of the tie rod 637 turn in the direction indicated by the arrow RT relative to the left transmission plate 632 and the right transmission plate 633, respectively. As a result, the left transmission plate 632 and the right transmission plate 633 turn in the direction indicated by the arrow LT with the tie rod 637 maintaining its posture.

When the left transmission plate 632 turns in the direction indicated by the arrow LT, the left bracket 71, which is not allowed to turn relative to the left transmission plate 632, turns in the direction indicated by the arrow LT around the left steering axis SL relative to the left side member 53.

When the right transmission plate 633 turns in the direction indicated by the arrow LT, the right bracket 81, which is not allowed to turn relative to the right transmission plate 633, turns in the direction indicated by the arrow LT around the right steering axis SR relative to the right side member 54.

When the left bracket 71 turns in the direction indicated by the arrow LT, the left shock absorbing device 72, which is supported on the left bracket 71, turns in the direction indicated by the arrow LT around the left steering axis SL relative to the left side member 53. When the left shock absorbing device 72 turns in the direction indicated by the arrow LT, the left wheel 31, which is supported on the left shock absorbing device 72 via the left wheel axle 723, turns in the direction indicated by the arrow LT around the left steering axis SL relative to the left side member 53. As this occurs, the left fender also turns in the direction indicated by the arrow LT together with the left wheel 31.

When the right bracket 81 turns in the direction indicated by the arrow LT, the right shock absorbing device 82, which is supported on the right bracket 81, turns in the direction indicated by the arrow LT around the right steering axis SR relative to the right side member 54. When the right shock absorbing device 82 turns in the direction indicated by the arrow LT, the right wheel 32, which is supported on the right shock absorbing device 82 via the right wheel axle 823, turns in the direction indicated by the arrow LT around the right steering axis SR relative to the right side member 54. As this occurs, the right fender also turns in the direction indicated by the arrow LT together with the right wheel 32.

When the rider operates the handlebar 61 so as to steer the left and right wheels to turn to the right, the elements described above turn in an opposite direction to the direction in which they turn when the left and right front wheels are steered to turn to the left. Since the elements move simply in the opposite directions in the left-right direction, a detailed description of the movements of the elements when the rider so operates the handlebar 61 will be omitted here.

That is, the steering force transmission mechanism 63 couples the left suspension unit 7 and the right suspension unit 8 together and turns the left wheel 31 and the right wheel 32 in the direction in which the handlebar 61 is turned.

For example, when the handlebar 61 is turned in the direction indicated by the arrow LT as illustrated in FIG. 4, a signal corresponding to the turning of the handlebar 61 is inputted from the control unit 93 to the steering actuator 91. The steering actuator 91 imparts a force to turn the left suspension unit 7 around the left steering axis SL and a force to turn the right suspension unit 8 around the right steering axis SR to the steering force transmission mechanism 63.

For example, in the case where the left wheel 31 and the right wheel 32 turn in the direction indicated by the arrow LT in FIG. 4 as a result of self-steering, a signal enabling a steady cornering in which the steering angles of the left wheel 31 and the right front wheel 32 are maintained is inputted from the control unit 93 to the steering actuator 91. The steering actuator 91 imparts forces to turn the left suspension unit 7 and the right suspension unit 8 around the left steering axis SL and the right steering axis SR, respectively, in the direction indicated by the arrow RT to the steering force transmission mechanism 63. This enables the steady cornering.

Next, referring to FIGS. 2 and 5, a leaning operation of the leaning vehicle 1 will be described. FIG. 5 is a front view of the front portion of the leaning vehicle 1 as viewed from the front in the front-rear direction of the body frame 21, with the body frame 21 caused to lean to the left of the leaning vehicle 1. In FIG. 5, the front portion of the leaning vehicle 1 is illustrated as seen through the front cover 221, the two front fenders 222, and the leg shield 224 that are indicated by dashed lines.

As illustrated in FIG. 2, when the leaning vehicle 1 is viewed from the front of the body frame 21 in the upright state, the link mechanism 5 exhibits a rectangle shape. As illustrated in FIG. 9, when the leaning vehicle 1 is viewed from the front of the body frame 21 with the leaning vehicle 1 in a leaned state, the link mechanism 5 exhibits a parallelogram shape. The operation of the link mechanism 5 is interlocked with the leaning of the body frame 21 in the left-right direction thereof. The "operation of the link mechanism 5" means a change in the shape of the link mechanism 5 as a result of the upper cross member 51 and the lower cross member 52 turning relative to the head pipe 211 about the upper intermediate leaning axis LUI and the lower intermediate leaning axis LDI, respectively, and the upper cross member 51, the lower cross member 52, the left side member 53 and the right side member 54 turning relatively about the upper left leaning axis LUL, the upper right leaning axis LUR, the lower left leaning axis LDL and the lower right leaning axis LDR, respectively.

For example, as illustrated in FIG. 5, when the rider leans the leaning vehicle 1 to the left, the head pipe 211 leans to the left relative to or from the vertical direction. When the head pipe 211 leans so, the upper cross member 51 turns counterclockwise relative to the head pipe 211 around the upper intermediate leaning axis LUI that passes through the upper intermediate leaning bearing portion 211a when the leaning vehicle 1 is viewed from the front thereof. Similarly, the lower cross member 52 turns counterclockwise relative to the head pipe 211 around the lower intermediate leaning axis LDI that passes through the lower intermediate leaning bearing portion 211b when the leaning vehicle 1 is viewed from the front thereof. As a result, the upper cross member 51 moves to the left in the left-right direction of the body frame 21 relative to the lower cross member 52.

As a result of the upper cross member 51 moving in the way described above, the upper cross member 51 turns counterclockwise around the upper left leaning axis LUL that passes through the upper left leaning bearing portion 53a and the upper right leaning axis LUR that passes through the upper right leaning bearing portion 54a relative to the left side member 53 and the right side member 54, respectively, when the leaning vehicle 1 is viewed from the front thereof. Similarly, the lower cross member 52 turns counterclockwise around the lower left leaning axis LDL that passes through the lower left leaning bearing portion 53b and the lower right leaning axis LDR that passes through the lower right leaning bearing portion 54b relative to the left side member 53 and the right side member 54, respectively, when the leaning vehicle 1 is viewed from the front thereof. As a result, the left side member 53 and the right side member 54 lean to the left of the leaning vehicle 1 from the vertical direction while maintaining their postures parallel to the head pipe 211.

As this occurs, the lower cross member 52 moves to the left in the left-right direction of the body frame 21 relative to the tie rod 637. As a result of the lower cross member 52 moving as described above, the tie rod 637 turns relative to the intermediate joint 634, the left joint 635, and the right joint 636 around the intermediate joint leaning bearing portion 634b, the left joint leaning bearing portion 635b, and the right joint leaning bearing portion 636b, respectively. As a result of this, the tie rod 637 keeps its posture parallel to the upper cross member 51 and the lower cross member 52.

The left bracket 71, which is supported on the left side member 53 via the left turnable member, leans to the left of the leaning vehicle 1 as the left side member 53 leans to the left of the leaning vehicle 1. In association with the leftward leaning of the left bracket 71, the left shock absorbing device 72, which is supported on the left bracket 71, also leans to the left of the leaning vehicle 1. As a result of this, the left wheel 31 supported on the left shock absorbing device 72 leans to the left of the leaning vehicle 1 while maintaining its posture parallel to the head pipe 211.

The right bracket 81, which is supported on the right side member 54 via the right turnable member, leans to the left of the leaning vehicle 1 as the right side member 54 leans to the left of the leaning vehicle 1. In association with the leftward leaning of the right bracket 81, the right shock absorbing device 82, which is supported on the right bracket 81, also leans to the left of the leaning vehicle 1. As a result of this, the right wheel 32, which is supported on the right shock absorbing device 82, leans to the left of the leaning vehicle 1 while maintaining its posture parallel to the head pipe 211.

The leaning operations of the left wheel 31 and the right wheel 32 are described based on the vertical direction. However, when the leaning vehicle 1 leans (when the link mechanism 5 is in operation), the up-down direction of the body frame 21 does not coincide with the vertical up-down direction. In the case where the leaning operation of the left wheel 31 and the right wheel 32 is described based on the up-down direction of the body frame 21, when the link mechanism 5 is in operation, the relative positions of the left wheel 31 and the right front wheel 32 are changed in the up-down direction of the body frame 21. In other words, the link mechanism 5 changes the relative positions of the left wheel 31 and the right wheel 32 in the up-down direction of the body frame 21 to thereby cause the body frame 21 to lean leftward or rightward from the vertical direction. This causes the leaning vehicle 1 to turn to the left.

When the rider leans the leaning vehicle 1 to the right, the relevant elements lean to the right. This causes the leaning vehicle 1 to turn to the right. Since the elements move simply in the opposite directions in the left-right direction, a detailed description of the movements of the elements when the rider so operates the handlebar 61 will be omitted here.

Figure 6:
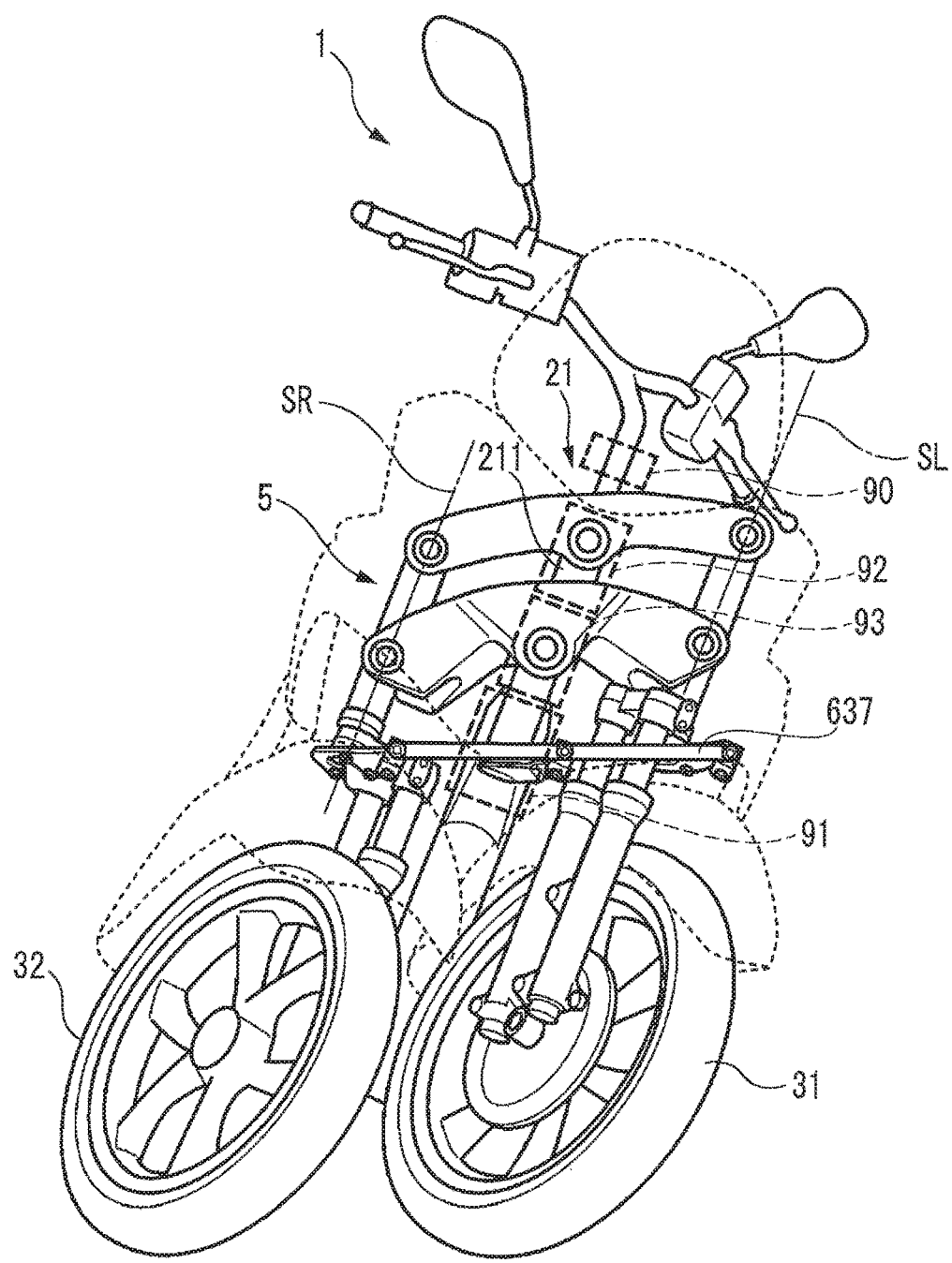
FIG. 6 is a rear view illustrating the leaning vehicle of FIG. 1 when leaning to the left and steering to the left are performed.

FIG. 6 is a front view of the front portion of the leaning vehicle 1 when viewed from the front in the front- and rear direction of the body frame 21 with the leaning vehicle 1 leaned leftward and steered to the left. FIG. 6 illustrates the front portion of the leaning vehicle 1 as seen through the front cover 221 and the two front fenders 222 that are illustrated by dashed lines.

When the front wheels are steered to turn as described above, the left wheel 31 is turned counterclockwise around the left steering axis SL, while the right wheel 32 is turned counterclockwise around the right steering axis SR. The left wheel 31 and the right wheel 32 lean to the left of the leaning vehicle 1 together with the body frame 21 as a result of the leaning operation being performed. That is, in this state, the link mechanism 5 is exhibiting the parallelogram shape. The tie rod 637 has moved to the left in the left-right direction of the body frame 21 and to the rear in the front-rear direction of the body frame 21 from the position of the tie rod 637 at which the body frame 21 is in the upright state.

As illustrated in FIGS. 2 to 6, the leaning vehicle 1 includes a leaning actuator 92. The leaning actuator 92 constitutes a device for imparting a force to lean the body frame 21 leftward or rightward to the link mechanism 5. The leaning actuator 92 can be implemented with an electric motor or a hydraulic motor.

For example, when the body frame 21 is leaned leftward as illustrated in FIG. 5, the leaning actuator 92 imparts forces to turn the upper cross member 51 and the lower cross member 52 clockwise relative to the head pipe 211, the left side member 53, and the right side member 54 to the link mechanism 5.

For example, the leaning actuator 92 imparts forces to turn the upper cross member 51 and the lower cross member 52 counterclockwise relative to the head pipe 211, the left side member 53, and the right side member 54 to the link mechanism 5 with the body frame 21 leaning more to the left of the leaning vehicle 1. As a result, the leaning angle of the body frame 21 can be controlled appropriately.

Figure 7:
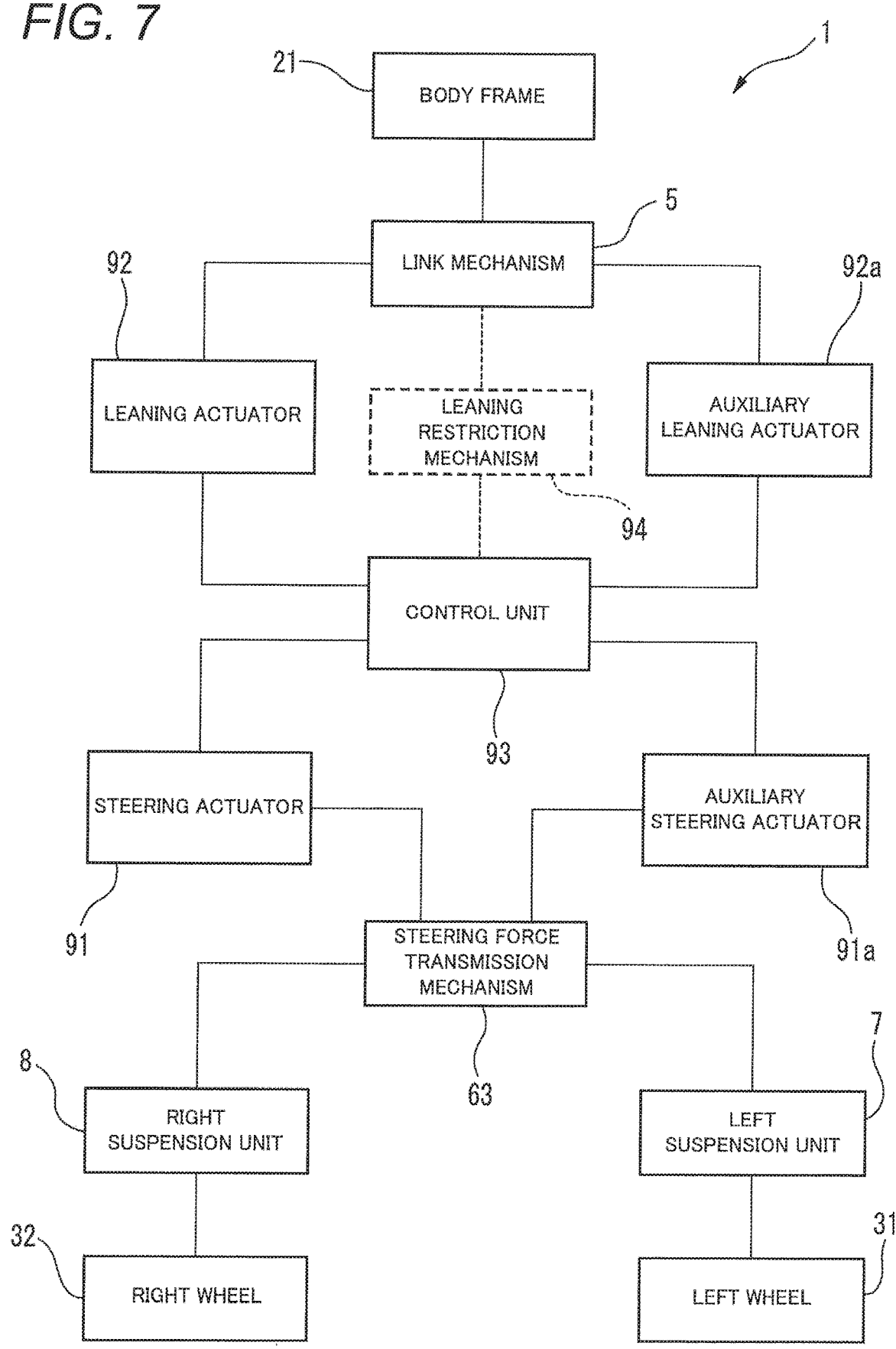
FIG. 7 is a diagram illustrating a functional configuration of the leaning vehicle of FIG. 1.

As illustrated in FIG. 7, the control unit 93 is connected to the steering actuator 91 and the leaning actuator 92. The control unit 93 can control the operation of the steering actuator 91 and the operation of the leaning actuator 92. The control unit 93 controls the operation of the steering actuator 91 and the operation of the leaning actuator 92 in cooperation with the steering mechanism 6 to thereby control the leaning angle of the body frame 21 leftward or rightward.

For example, when the body frame 21 leans to the left of the leaning vehicle 1 as illustrated in FIG. 5, the left wheel 31 and the right wheel 32 turn in the direction indicted by the arrow LT in FIG. 4 due to the self-steering. At this time, the control unit 93 causes the steering actuator 91 to impart forces to turn the left suspension unit 7 and the right suspension unit 8 in the direction indicated by the arrow LT around the left steering axis SL and the right steering axis SR, respectively, to the steering mechanism 6. At the same time, the control unit 93 causes the leaning actuator 92 to impart forces to turn the upper cross member 51 and the lower cross member 52 clockwise relative to the head pipe 211, the left side member 53 and the right side member 54 to the link mechanism 5.

As a result, the leaning angle of the body frame 21 is adjusted to a desired angle. Loads that are generated on the steering actuator 91 and the leaning actuator 92 can be reduced since these actuators perform the operations described above in cooperation with each other.

Figure 8:
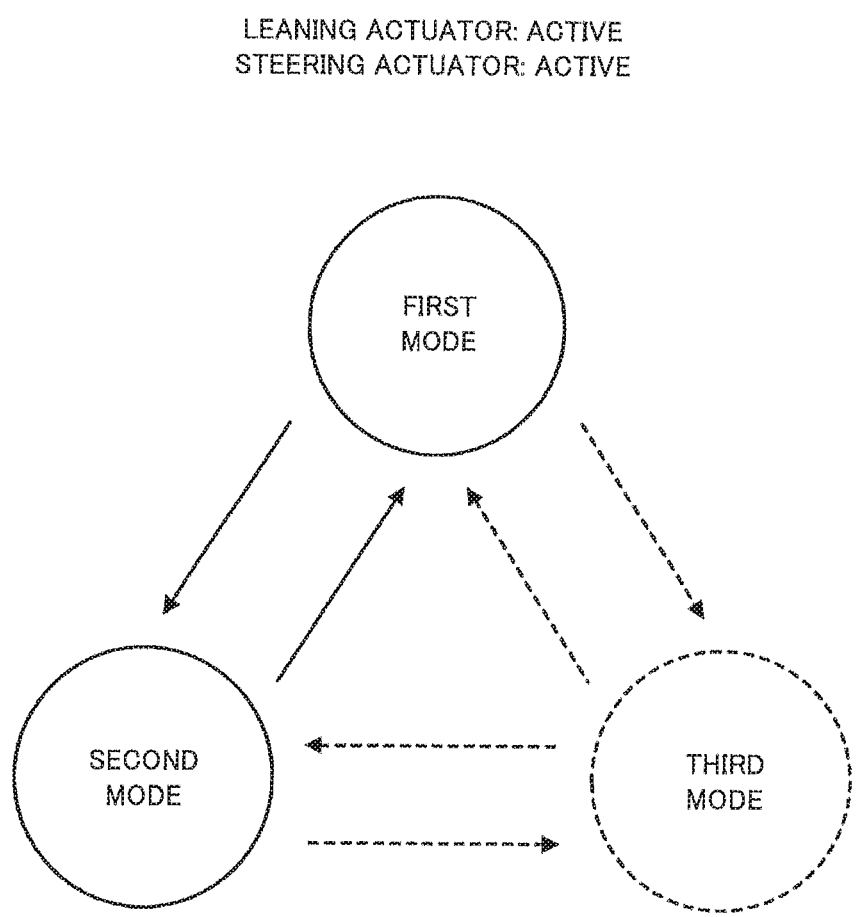
FIG. 8 is a diagram illustrating mode transitions to be performed in the leaning vehicle of FIG. 1.

As illustrated in FIG. 8, the control unit 93 can select two operation modes. The two operation modes include a first mode and a second mode.

The first mode is a mode where the operations described above are performed. That is, the control unit 93 employs both the steering actuator 91 and the leaning actuator 92 to control the leaning angle of the body frame 21 to the left or the right of the leaning vehicle 1.

In the second mode, the control unit 93 does not employ the leaning actuator 92 but employs the steering actuator 91 to control the leaning angle of the body frame 21 leftward or rightward. In other words, the leaning actuator 92 is placed in a rest state while the second mode is selected by the control unit 93.

The first mode is based on a linked operation between the steering actuator 91 and the leaning actuator 92. As a result, the operation frequency of each of the actuators tends to be increased. Consequently, heat is generated in the actuators, and hence, countermeasures against the heat so generated need to be taken.

As countermeasures to be taken, the following approaches are considered:
(1) high specifications are imparted to the actuators; and (2) to deal with a case where a specific actuator is prevented from performing the desired operation, another actuator having the same configuration as the specific actuator is prepared to back up the actuator in trouble. However, these countermeasure approaches both result in an increase in the space occupied by the actuators and hence in an enlargement in size of the vehicle body.

According to the configuration of this embodiment, however, since an operation state where the leaning actuator 92 is at rest (the second mode) can be realized, specifications required on the leaning actuator 92 can be mitigated. Thus, an enlargement in size of the vehicle body can be suppressed while realizing the cooperative control (the first mode) between the steering actuator 91 and the leaning actuator 92.

As illustrated in FIG. 7, the leaning vehicle 1 includes an auxiliary leaning actuator 92*a*. The auxiliary actuator 92*a* has the same configuration as that of the leaning actuator 92. The auxiliary actuator 92*a* is connected to the control unit 93.

The auxiliary leaning actuator 92*a* is provided based on the countermeasure approach (2) described above. That is, in the event where the leaning actuator 92 happens to be not able to perform the desired operation, the control unit 93 stops controlling the operation of the leaning actuator 92 and causes the auxiliary leaning actuator 92*a* to perform the desired operation instead.

In this way, even in the case where the auxiliary leaning actuator 92*a* configured to perform the back-up operation is prepared separately, since enlargement in size of the individual actuators can be avoided, enlargement in size of the vehicle body can be prevented.

Figure 9A:
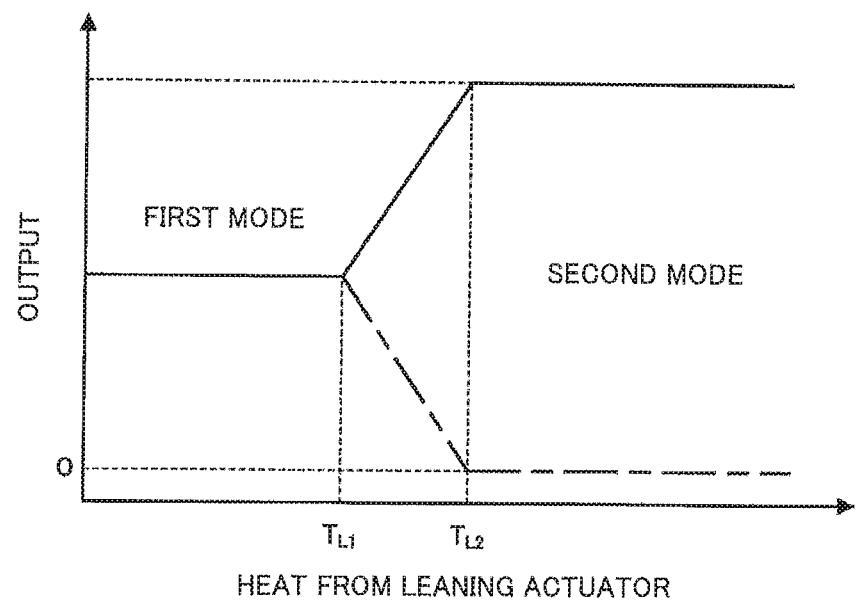
FIG. 9A is a diagram illustrating a mode transition to be performed in the leaning vehicle of FIG. 1.

FIG. 9A illustrates an example of an operation when the control unit 93 transitions from the first mode to the second mode. In the figure, a solid line denotes a relationship between an output of the steering actuator 91 and a temperature of the leaning actuator 92 for controlling the leaning angle of the body frame 21. A chain line denotes a relationship between an output of the leaning actuator 92 and a temperature of the leaning actuator 92 for controlling the leaning angle of the body frame 21.

The control unit 93 monitors heat generated by the leaning actuator 92 with a temperature sensor (not illustrated). A monitoring target may be a temperature of the leaning actuator 92 itself or a temperature at an appropriate location that correlates with heat from the leaning actuator 92.

When a temperature that is detected by the temperature sensor reaches a predetermined threshold $T_{L1}$, the control unit 93 starts a transition from the first mode to the second mode. Specifically, the control unit 93 decreases the output of the leaning actuator 92 non-stepwise to zero as the temperature detected by the temperature sensor increases. On the other hand, the control unit 93 increases the output of the steering actuator 91 non-stepwise up to a predetermined higher value. When the temperature detected by the temperature sensor reaches a predetermined threshold $T_{L2}$, the leaning actuator 92 is placed in the rest state, whereby the transition to the second mode is completed. When the heat from the leaning actuator 92 decreases, on the contrary, a transition from the second mode to the first mode is performed.

That is, in this example, a transition between the first mode and the second mode is performed in such a manner that the output of the leaning actuator 92 configured to control the leaning angle of the body frame 21 takes a value between a value taken before the transition and a value taken after the transition.

According to this configuration, it is possible to not only suppress an uncomfortable feeling that would be given to the driver due to the transition between the first mode and the second mode but also to provide a smoother turning operation.

In this example, the outputs of the steering actuator 91 and the leaning actuator 92 in the first mode coincide with each other. However, the outputs of the steering actuator 91 and the leaning actuator 92 in the first mode can individually be set at appropriate values.

Figure 9B:
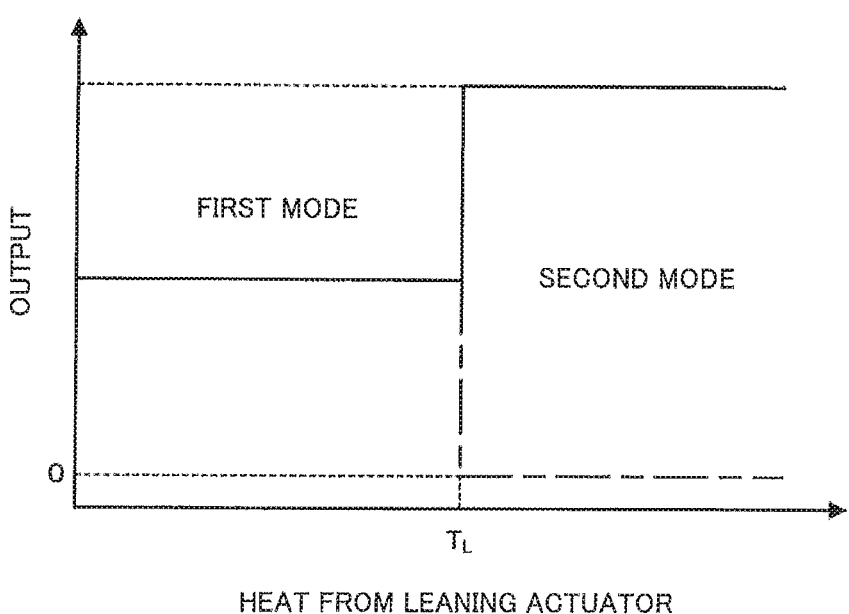
FIG. 9B is a diagram illustrating a mode transition to be performed in the leaning vehicle of FIG. 1.

FIG. 9B illustrates another example of an operation performed when the control unit 93 transitions from the first mode to the second mode. In the figure, a solid line denotes a relationship between an output of the steering actuator 91 and a temperature of the leaning actuator 92 for controlling the leaning angle of the body frame 21. A chain line denotes a relationship between an output of the leaning actuator 92 and a temperature of the leaning actuator 92 for controlling the leaning angle of the body frame 21.

The control unit 93 monitors heat generated by the leaning actuator 92 with a temperature sensor (not illustrated). A monitoring target may be a temperature of the leaning actuator 92 itself or a temperature at an appropriate location that correlates with heat from the leaning actuator 92.

When the temperature detected by the temperature sensor reaches a predetermined threshold $T_L$, the control unit 93 executes a transition from the first mode to the second mode. Specifically, the control unit 93 switches the output of the leaning actuator 92 to zero. On the other hand, the control unit 93 switches the output of the steering actuator 91 to a predetermined higher value. As a result, the leaning actuator 92 is placed in the rest state. When the heat from the leaning actuator 92 decreases, on the contrary, a transition from the second mode to the first mode is performed.

That is, in this example, the transition between the first mode and the second mode is performed without causing the output of the leaning actuator 92 for controlling the leaning angle of the body frame 21 to take a value between the value before the transition and the value after the transition.

According to this configuration, a smooth transition between the first mode and the second mode can be provided even when the leaning vehicle 1 takes a quick and sharp turn. In addition, since a time required until the leaning actuator is placed in the rest state can be shortened, the consumption of electric power and the generation of heat can be suppressed further. Suppressing the consumption of electric power contributes to miniaturization of a battery to be mounted on the leaning vehicle 1 as well as expansion of driving range.

In this example, the outputs of the steering actuator 91 and the leaning actuator 92 in the first mode coincide with each other. However, the outputs of the steering actuator 91 and the leaning actuator 92 in the first mode can individually be set at appropriate values.

The output never takes two values simultaneously. Consequently, from a microscopic point of view, there exists a moment when the output of the leaning actuator 92 takes a value between the output in the mode before the transition and the output in the mode after the transition. In this description, the expression reading, "without taking a value between the value before the transition and the value after the transition" means that the output is switched over between the two values without positively taking a value between the value before the transition and the value after the transition on a substantial control time scale. Consequently, in the example illustrated in FIG. 9A, the value of the output may be varied stepwise so as to positively take a value between the value before the transition and the value after the transition.

As indicated by dashed lines in FIG. 8, the control unit 93 can further select a third mode. In the third mode, the control unit 93 does not employ the steering actuator 91 but employs the leaning actuator 92 to control the leaning angle of the body frame 21 leftward or rightward. In other words, the steering actuator 91 is placed in the rest state while the third mode is selected by the control unit 93.

According to this configuration, since an operation state where the steering actuator 91 is at rest (the third mode) can be realized, the specification requirements imposed on the steering actuator 91 can be mitigated. Thus, an enlargement in size of the vehicle body can be suppressed while realizing the cooperative control (the first mode) between the steering actuator 91 and the leaning actuator 92.

As illustrated in FIG. 7, the leaning vehicle 1 includes an auxiliary steering actuator 91a. The auxiliary steering actuator 91a has the same configuration as that of the steering actuator 91. The auxiliary steering actuator 91a is connected to the control unit 93.

The auxiliary steering actuator 91a is provided based on the countermeasure approach (2) described above. That is, in the event where the steering actuator 91 happens to be not able to perform the desired operation, the control unit 93 stops controlling the operation of the steering actuator 91 and causes the auxiliary steering actuator 91a to perform the desired operation instead.

In this way, even in the case where the auxiliary steering actuator 91a configured to perform the back-up operation is prepared separately, since enlargement in size of the individual actuators can be avoided, enlargement in size of the vehicle body can be prevented.

A more flexible mode selection in accordance with the conditions of the steering actuator 91 and the leaning actuator 92 can be realized by the fact that the third mode is selectable in addition to the first mode and the second mode.

Figure 10A:
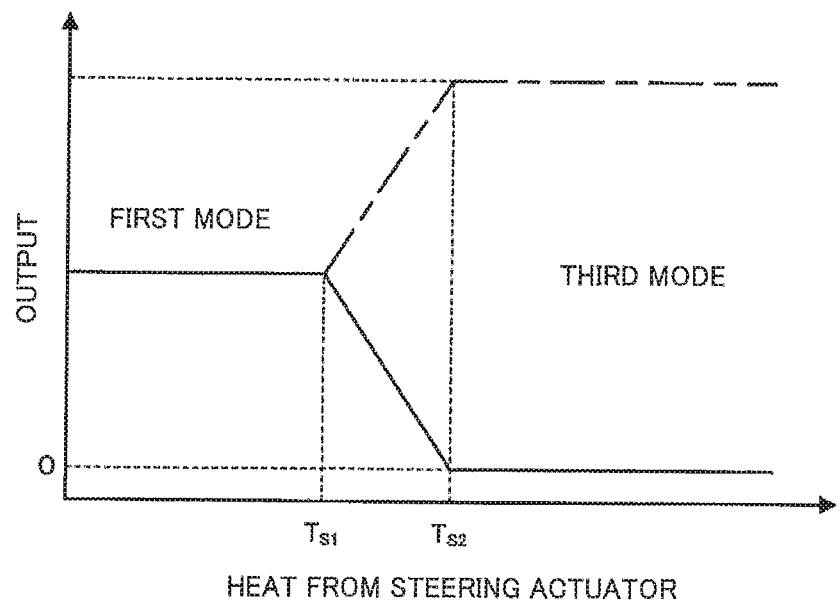
FIG. 10A is a diagram illustrating a mode transition to be performed in the leaning vehicle of FIG. 1.

FIG. 10A illustrates an example of an operation when the control unit 93 transits from the first mode to the third mode. In the figure, a solid line denotes a relationship between an output of the steering actuator 91 and a temperature of the steering actuator 91 for controlling the leaning angle of the body frame 21. A chain line denotes a relationship between an output of the leaning actuator 92 and a temperature of the steering actuator 91 for controlling the leaning angle of the body frame 21.

The control unit 93 monitors heat generated by the steering actuator 91 with a temperature sensor (not illustrated). A monitoring target may be a temperature of the steering actuator 91 itself or a temperature at an appropriate location that correlates with heat from the steering actuator 91.

When a temperature that is detected by the temperature sensor reaches a predetermined threshold $T_{S1}$, the control unit 93 starts a transition from the first mode to the third mode. Specifically, the control unit 93 decreases the output of the steering actuator 91 non-stepwise to zero as the temperature detected by the temperature sensor increases. On the other hand, the control unit 93 increases the output of the leaning actuator 92 non-stepwise up to a predetermined higher value. When the temperature detected by the temperature sensor reaches a predetermined threshold $T_{S2}$, the steering actuator 91 is placed in the rest state, whereby the transition to the third mode is completed. When the heat from the steering actuator 91 decreases, on the contrary, a transition from the third mode to the first mode is performed.

That is, in this example, a transition between the first mode and the third mode is performed in such a manner that the output of the steering actuator 91 configured to control the leaning angle of the body frame 21 takes a value between a value taken before the transition and a value taken after the transition.

According to this configuration, it is possible to not only suppress an uncomfortable feeling that would be given to the driver due to the transition between the first mode and the third mode but also to provide a smoother turning operation.

In this example, the outputs of the steering actuator 91 and the leaning actuator 92 in the first mode coincide with each other. However, the outputs of the steering actuator 91 and the leaning actuator 92 in the first mode can individually be set at appropriate values.

Figure 10B:
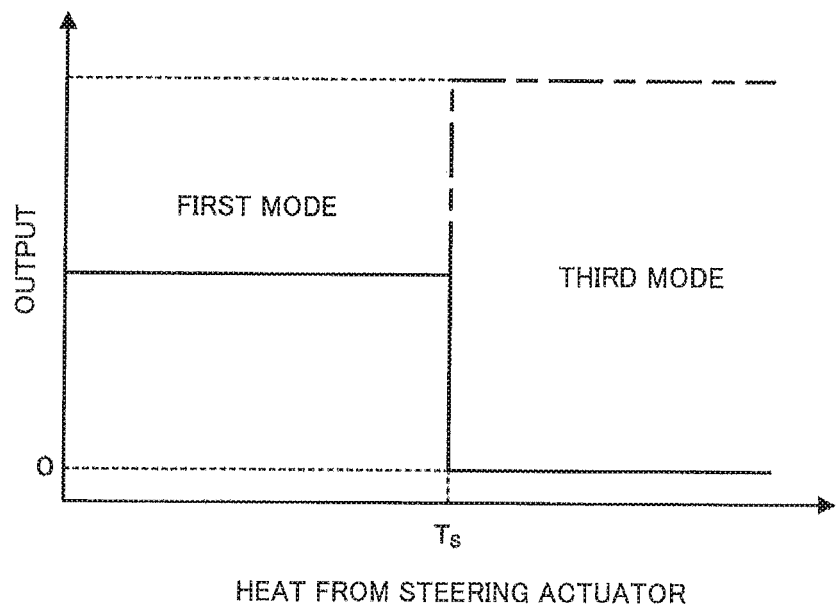
FIG. 10B is a diagram illustrating a mode transition to be performed in the leaning vehicle of FIG. 1.

FIG. 10B illustrates another example of an operation performed when the control unit 93 transitions from the first mode to the third mode. In the figure, a solid line denotes a relationship between an output of the steering actuator 91 and a temperature of the steering actuator 91 for controlling the leaning angle of the body frame 21. A chain line denotes a relationship between an output of the leaning actuator 92 and a temperature of the steering actuator 91 for controlling the leaning angle of the body frame 21.

The control unit 93 monitors heat generated by the steering actuator 91 with a temperature sensor (not illustrated). A monitoring target may be a temperature of the steering actuator 91 itself or a temperature at an appropriate location that correlates with heat from the steering actuator 91.

When a temperature that is detected by the temperature sensor reaches a predetermined threshold $T_S$, the control unit 93 starts a transition from the first mode to the third mode. Specifically, the control unit 93 switches the output of the steering actuator 91 to zero. On the other hand, the control unit 93 switches the output of the leaning actuator 92 to a predetermined higher value. As a result, the steering actuator 91 is placed in the rest state. When the heat from the steering actuator 91 decreases, on the contrary, a transition from the third mode to the first mode is performed.

That is, in this example, the transition between the first mode and the third mode is performed without causing the output of the steering actuator 91 for controlling the leaning angle of the body frame 21 to take a value between the value before the transition and the value after the transition.

According to this configuration, a smooth transition between the first mode and the third mode can be provided even when the leaning vehicle 1 takes a quick and sharp turn. In addition, since a time required until the steering actuator is placed in the rest state can be shortened, the consumption of electric power and the generation of heat can be suppressed further. Suppressing the consumption of electric power contributes to miniaturization of a battery to be mounted on the leaning vehicle 1 as well as expansion of driving range.

In this example, the outputs of the steering actuator 91 and the leaning actuator 92 in the first mode coincide with each other. However, the outputs of the steering actuator 91 and the leaning actuator 92 in the first mode can individually be set at appropriate values.

The output never takes two values simultaneously. Consequently, from a microscopic point of view, there exists a moment when the output of the leaning actuator 92 takes a value between the output in the mode before the transition and the output in the mode after the transition. In this description, the expression reading, "without taking a value between the value before the transition and the value after the transition" means that the output is switched over between the two values without positively taking a value between the value before the transition and the value after the transition on a substantial control time scale. Consequently, in the example illustrated in FIG. 10A, the value of the output may be varied stepwise so as to positively take a value between the value before the transition and the value after the transition.

In the examples described heretofore, the control unit 93 selects any one of the first mode, the second mode, and the third mode based on the heat that the steering actuator 91 generates and the heat that the leaning actuator 92 generates.

According to this configuration, it is possible to provide a direct mode selection control that can realize better matching with the required heat countermeasures.

However, the parameters that are referred to as the reference for mode transitions are not limited to the heat that the steering actuator 91 generates and the heat that the leaning actuator 92 generates. Appropriate parameters that can reflect the operation frequencies of the steering actuator 91 and the leaning actuator 92 can be referred to as the reference for mode transition. For instance, a value of voltage applied to the steering actuator 91, a value of electric current that flows to the steering actuator 91, a value of voltage applied to the leaning actuator 92, and a value of electric current that flows to the leaning actuator 92 can be exemplified for such parameters.

The control unit 93 may be configured to enable at least the transition between the first mode and the second mode as well as the transition between the first mode and the third mode.

In this case, it is possible to realize a selective transition to the second mode or the third mode from the first mode that is referred to as a basic mode, thereby enabling suppression of an increase in a processing load of the control unit 93.

As indicated by dashed lines in FIG. 8, the control unit 93 may be configured to permit a direct transition between the second mode and the third mode. In this case, the transitions among the first mode, the second mode, and the third mode may be configured to permit all permutations thereof.

Figure 11:
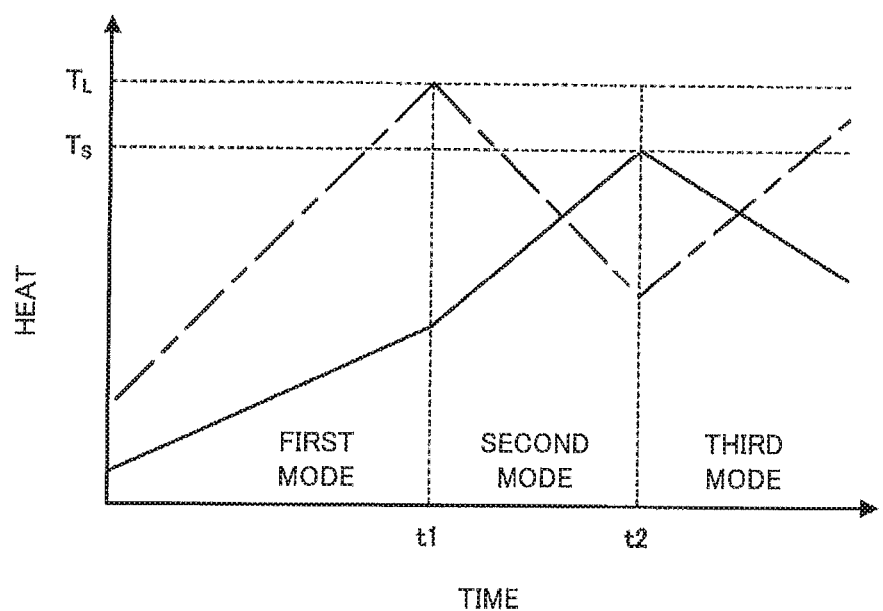
FIG. 11 is a diagram illustrating mode transitions to be performed in the leaning vehicle of FIG. 1.

FIG. 11 illustrates an example of a case where such transitions are performed. In the figure, a solid line denotes a chronological change in heat that the steering actuator 91 generates. A chain line denotes a chronological change in heat that the leaning actuator 92 generates.

When the heat that the leaning actuator 92 generates increases during an operation in the first mode, and a temperature detected by the temperature sensor at a time t1 reaches a predetermined threshold $T_L$, a transition to the second mode is performed. As this occurs, the heat that the leaning actuator 92 generates is decreased. On the other hand, the heat that the steering actuator 91 generates is increased. When a temperature that is detected by the temperature sensor at a time t2 reaches the predetermined threshold $T_L$, a transition to the third mode is required. This is because a condition for execution of the first mode in which both the actuators are employed is not satisfied. In the case where the heat that the steering actuator 91 generates is decreased sufficiently, a transition to the first mode can be executed.

Since the transitions among first mode, the second mode, and the third mode are performed so as to permit all permutations thereof, it is possible to deal with a situation as described above. That is, a more flexible mode transition in accordance with the states of the steering actuator 91 and the leaning actuator 92 can be provided.

The transition between the second mode and the third mode can be performed in such a manner that the output of the steering actuator 91 and the output of the leaning actuator 92 for controlling the leaning angle of the body frame 21 take values between the values in the second mode and the values in the third mode. In this case, the values of the outputs may be varied non-stepwise or stepwise. Alternatively, the transition between the second mode and the third mode can be performed in such a manner that the output of the steering actuator 91 and the output of the leaning actuator 92 for controlling the leaning angle of the body frame 21 do not take values between the second mode and the third mode.

As described above, the leaning vehicle 1 according to this embodiment includes the auxiliary steering actuator 91*a* and the auxiliary leaning actuator 92*a*. However, at least one of the auxiliary steering actuator 91*a* and the auxiliary leaning actuator 92*a* can be omitted. That is, at least one of the steering actuator 91 and the leaning actuator 92 can be implemented with a single actuator.

As a result of the specification requirements for the individual actuators being mitigated, the auxiliary actuator for performing a backup operation can be made unnecessary. Accordingly, an increase in space that is occupied by the actuators can be suppressed, whereby an enlargement in size of the vehicle body can be suppressed.

As indicated by dashed lines in FIG. 7, the leaning vehicle 1 can include a leaning restriction mechanism 94. The leaning restriction mechanism 94 is a mechanism for restricting the operation of the link mechanism 5. The leaning restriction mechanism 94 may be a mechanism for imparting a resisting force to a relative turning between the upper cross member 51 or the lower cross member 52 and the head pipe 211, or a mechanism for preventing the relative turning therebetween. For example, a plate-shaped member may be provided on the upper cross member 51 or the lower cross member 52, and a caliper device that can grip on the plate-shaped member may be provided on the head pipe 211. The relative turning of the upper cross member 51 or the lower cross member 52 and the head pipe 211 can be restrained or prevented by causing the caliper device to grip the plate-shaped member at a required timing.

In this case, the control unit 93 may be configured to cause the leaning restriction mechanism 94 to restrict the operation of the link mechanism 5 while the second mode is being selected.

According to this configuration, a change in posture of the body frame 21 can be restricted when the second mode is selected in which the leaning actuator 92 is not employed. As a result, the consumption of electric power by and the generation of heat in the leaning actuator 92 can be suppressed, even though the posture of the body frame 21 can easily be maintained when the leaning vehicle 1 is traveling at low speeds, the rider walks while pushing the leaning vehicle 1, or the leaning vehicle 1 is halted. Suppressing the consumption of electric power contributes to miniaturization of a battery to be mounted on the leaning vehicle 1 as well as expansion of driving range.

The embodiment that has been described heretofore is intended to facilitate the understanding of the presently disclosed subject matter, and is not intended to limit the contents of the disclosure. The above embodiment can be modified or improved without departing from the fundamental concept of the presently disclosed subject matter.

In the above embodiment, the leaning vehicle 1 includes the two front wheels 3. According to this configuration, the link mechanism 5 and the leaning actuator 92 can be disposed closer to the front end of the leaning vehicle 1. As a result, since the leaning actuator 92 is easily exposed to running air, the requirement in relation to heat can be mitigated. Consequently, the necessity of employing a large leaning actuator with a large heat capacity can be suppressed, thereby suppressing the enlargement of the vehicle body.

However, a configuration can also be adopted in which the leaning vehicle includes one front wheel and two rear wheels. However, the one front wheel needs to be a wheel to be steered.

In the embodiment described above, the handlebar 61 is made up of the single member that extends in the left-right direction of the body frame. However, the handlebar 61 may be made up of individual members including a left handlebar portion configured to be operated by the left hand of the rider and a right handlebar portion configured to be operated by the right hand of the rider, provided that steering force to turn the left wheel 31 and the right wheel 32 can be inputted through the handlebar 61. Alternatively, the handlebar 61 may take a form of a steering wheel or a steering rod.

A configuration may be adopted in which the link mechanism 5 comprises a cross member other than the upper cross member 51 and the lower cross member 52. The "upper cross member" and the "lower cross member" are merely so called based on their relative positional relationship in the up-down direction. The upper cross member does not mean an uppermost cross member in the link mechanism 5. The upper cross member means a cross member which lies above another cross member which lies therebelow. The lower cross member does not mean a lowermost cross member in the link mechanism 5. The lower cross member means a cross member which lies below another cross member which lies thereabove.

In the above embodiment, the link mechanism 5 includes the so-called parallel four-joint link system. Namely, the upper cross member 51, the lower cross member 52, the left side member 53 and the right side member 54 are supported on the body frame 21 so that the upper cross member 51 and the lower cross member 52 are kept in a posture in which the upper cross member 51 and the lower cross member 52 are parallel to each other and that the left side member 53 and the right side member 54 are kept in a posture in which the left side member 53 and the right side member 54 are parallel to each other. However, a so-called double wishbone-type link mechanism can be adopted, provided that the body frame 21 can be caused to lean leftward or rightward by changing the relative positions of the left wheel 31 and the right wheel 32 to the body frame 21.

In the embodiment described above, the control unit 93 is provided as an individual member from the steering actuator 91 and the leaning actuator 92. However, a configuration for realizing at least part of the function of the control unit 93 can be provided integrally with at least one of the steering actuator 91 and the leaning actuator 92.

In the embodiment described above, the control unit 93 is described as being able to select the third mode in addition the basic configuration in which the control unit 93 can select the first mode and the second mode. However, a control unit can also be adopted in which the control unit can select the second mode in addition to a basic configuration in which the control unit can select the first mode and the third mode.

The terms and expressions that are used in this description are used to describe the embodiment of the disclosed concept and hence should not be construed as limiting the scope of the invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are comprised therein. When used in this description to depict directions and members, the expression reading "along a certain direction" means that a case where something inclines at an angle falling within the range of ±40 degrees relative to the certain direction is comprised therein. When used in this description, the expression reading "something extends in a certain direction" means that a case where something extends while being inclined at an angle falling within the range of ±40 degrees relative to the certain direction is comprised therein.

When used in this description, the expression "so as not to be movable relative to the body frame 21" means that a certain part or member is caused to lean in the left-right direction of the leaning vehicle 1 together with the body frame 21 when the body frame 21 is caused to lean in the left-right direction of the leaning vehicle 1. When used in this description, the expression "so as not to be movable relative to the body frame 21" may comprehend not only a case where a certain part or member is directly fixed to the body frame but also a case where the certain part of member is fixed to a leaning vehicle component (a fuel tank, a bracket, the power unit 24, etc.) which is fixed on the body frame 21. Here the term "fixed" may comprehend a case that a certain part or member is fixed by way of a damping member or the like.

The disclosed concept can be implemented with many different embodiments. This description should be understood to provide a principle embodiment of the disclosed concept. The preferred embodiment which is at least described or illustrated in this description is so described or illustrated based on the understanding that the embodiment is not intended to limit the disclosed concept.

The disclosed concept comprehends every embodiment which comprises an equivalent element, a modification, a deletion, a combination (for example, a combination of characteristics of various embodiments), an improvement and an alteration which can be recognized by those skilled in the art based on the embodiment disclosed in this description. The limitative matters of claims should be construed widely based on terms used in the claims and hence should not be limited by the embodiment described in this specification or the prosecution of this patent application. Those embodiments should be construed as non-exclusive. For example, in this description, the terms "preferable" and "may" should be construed as being non-exclusive, and those terms mean, respectively, that it is "preferable but not limited thereto" and that it "may be acceptable but not limited thereto.

What is claimed is:

1. A leaning vehicle comprising:
   a body frame;
   at least three wheels including a left wheel and a right wheel that are arranged side by side in a left-right direction of the body frame;
   a left suspension unit supporting the left wheel that is included in the three wheels and as a front wheel a cross-sectional shape of which is curved;
   a right suspension unit supporting the right wheel that is included in the three wheels and as a front wheel a cross-sectional shape of which is curved; and
   a steering mechanism configured to turn the left suspension unit about a left steering axis and the right suspension unit about a right steering axis, thereby turning the left wheel and the right wheel about the left steering axis and the right steering axis respectively,
   wherein each of the left steering axis and the right steering axis is inclined downward in a front-rear direction of the body frame relative to a vertical direction;
   wherein a cross point between each of the left steering axis and the right steering axis and a ground is located ahead of a ground contact point of each of the left wheel and the right wheel in the front-rear direction of the body frame;
   wherein a cross-sectional shape of the ground contact point of the left wheel in a plane including a left axle is curved;
   wherein a cross-sectional shape of the ground contact point of the right wheel in a plane including a right axle is curved;
   wherein the leaning vehicle further comprises:
      a link mechanism configured to change positions of the left wheel and the right wheel relative to the body frame to cause the body frame to lean leftward when the leaning vehicle is steered leftward and to cause the body frame to lean rightward when the leaning vehicle is steered rightward;
      a steering actuator configured to impart a force causing the left suspension unit and the right suspension unit to respectively turn about the left steering axis and the right steering axis to the steering mechanism;
      a leaning actuator configured to impart a force causing the body frame to lean leftward or rightward to the link mechanism; and
      a control unit configured to select a first mode in which both of the steering actuator and the leaning actuator are employed, and a second mode in which the steering actuator is employed without employing the leaning actuator, in order to control a leaning angle of the body frame in cooperation with the steering mechanism.

2. The leaning vehicle according to claim 1, wherein the leaning actuator is implemented with a single actuator.

3. The leaning vehicle according to claim 1, wherein the control unit is configured to select one of the first mode and the second mode based on heat generated from the leaning actuator.

4. The leaning vehicle according to claim 1, wherein the control unit is configured to select, in addition to the first mode and the second mode, a third mode in which the leaning actuator is employed without employing the steering actuator.

5. The leaning vehicle according to claim 4, wherein the control unit is configured to perform a transition between the first mode and the third mode such that an output of the steering actuator for controlling the leaning angle takes a value between a value taken before the transition and a value taken after the transition.

6. The leaning vehicle according to claim 4, wherein the control unit is configured to perform a transition between the first mode and the third mode such that an output of the steering actuator for controlling the leaning angle takes no value between a value taken before the transition and a value taken after the transition.

7. The leaning vehicle according to claim 4,
wherein the steering actuator is implemented with a single actuator.

8. The leaning vehicle according to claim 4,
wherein the control unit is configured to select one of the first mode and the third mode based on heat generated from the steering actuator.

9. The leaning vehicle according to claim 4,
wherein the control unit is configured to perform a mode transition among the first mode, the second mode, and the third mode so as to permit at least a mode transition between the first mode and the second mode, and a mode transition between the first mode and the third mode.

10. The leaning vehicle according to claim 9,
wherein the control unit is configured to perform the mode transition among the first mode, the second mode, and the third mode so as to permit all permutations of the mode transition.

11. The leaning vehicle according to claim 1, further comprising:
a leaning restriction mechanism configured to restrict an operation of the link mechanism,
wherein the control unit is configured to cause the leaning restriction mechanism to restrict the operation of the link mechanism while the second mode is selected.

12. A leaning vehicle comprising:
a body frame;
at least three wheels including a left wheel and a right wheel that are arranged side by side in a left-right direction of the body frame;
a suspension unit supporting a wheel that is included in the three wheels and a front wheel a cross-sectional shape of which is curved; and
a steering mechanism configured to turn the suspension unit about a steering axis,
wherein the steering axis is inclined downward in a front-rear direction of the body frame relative to a vertical direction;
wherein a cross point between the steering axis and a ground is located ahead of a ground contact point of the front wheel in the front-rear direction of the body frame;
wherein a cross-sectional shape of the ground contact point of the front wheel in a plane including an axle of the front wheel is curved;
wherein the leaning vehicle further comprises:
a link mechanism configured to change positions of the left wheel and the right wheel relative to the body frame to cause the body frame to lean leftward when the leaning vehicle is steered leftward and to cause the body frame to lean rightward when the leaning vehicle is steered rightward;
a steering actuator configured to impart a force causing the suspension unit to turn about the steering axis to the steering mechanism;
a leaning actuator configured to impart a force causing the body frame to lean leftward or rightward to the link mechanism; and
a control unit configured to select a first mode in which both of the steering actuator and the leaning actuator are employed, and a second mode in which the steering actuator is employed without employing the leaning actuator, in order to control a leaning angle of the body frame in cooperation with the steering mechanism; and
wherein the control unit is configured to perform a transition between the first mode and the second mode such that an output of the leaning actuator for controlling the leaning angle takes a value between a value taken before the transition and a value taken after the transition.

13. A leaning vehicle comprising:
a body frame;
at least three wheels including a left wheel and a right wheel that are arranged side by side in a left-right direction of the body frame;
a suspension unit supporting a wheel that is included in the three wheels and a front wheel a cross-sectional shape of which is curved; and
a steering mechanism configured to turn the suspension unit about a steering axis,
wherein the steering axis is inclined downward in a front-rear direction of the body frame relative to a vertical direction;
wherein a cross point between the steering axis and a ground is located ahead of a ground contact point of the front wheel in the front-rear direction of the body frame;
wherein a cross-sectional shape of the ground contact point of the front wheel in a plane including an axle of the front wheel is curved;
wherein the leaning vehicle further comprises:
a link mechanism configured to change positions of the left wheel and the right wheel relative to the body frame to cause the body frame to lean leftward when the leaning vehicle is steered leftward and to cause the body frame to lean rightward when the leaning vehicle is steered rightward;
a steering actuator configured to impart a force causing the suspension unit to turn about the steering axis to the steering mechanism;
a leaning actuator configured to impart a force causing the body frame to lean leftward or rightward to the link mechanism; and
a control unit configured to select a first mode in which both of the steering actuator and the leaning actuator are employed, and a second mode in which the steering actuator is employed without employing the leaning actuator, in order to control a leaning angle of the body frame in cooperation with the steering mechanism; and
wherein the control unit is configured to perform a transition between the first mode and the second mode such that an output of the leaning actuator for controlling the leaning angle takes no value between a value taken before the transition and a value taken after the transition.

14. A leaning vehicle comprising:
a body frame;
at least three wheels including a left wheel and a right wheel that are arranged side by side in a left-right direction of the body frame;
a suspension unit supporting a wheel that is included in the three wheels and a front wheel a cross-sectional shape of which is curved; and
a steering mechanism configured to turn the suspension unit about a steering axis,
wherein the steering axis is inclined downward in a front-rear direction of the body frame relative to a vertical direction;

wherein a cross point between the steering axis and a ground is located ahead of a ground contact point of the front wheel in the front-rear direction of the body frame;

wherein a cross-sectional shape of the ground contact point of the front wheel in a plane including an axle of the front wheel is curved;

wherein the leaning vehicle further comprises:
- a link mechanism configured to change positions of the left wheel and the right wheel relative to the body frame to cause the body frame to lean leftward when the leaning vehicle is steered leftward and to cause the body frame to lean rightward when the leaning vehicle is steered rightward;
- a steering actuator configured to impart a force causing the suspension unit to turn about the steering axis to the steering mechanism;
- a leaning actuator configured to impart a force causing the body frame to lean leftward or rightward to the link mechanism; and
- a control unit configured to select a first mode in which both of the steering actuator and the leaning actuator are employed, and a second mode in which the steering actuator is employed without employing the leaning actuator, in order to control a leaning angle of the body frame in cooperation with the steering mechanism; and wherein the control unit is configured to select one of the first mode and the second mode based on parameters that reflects an operation frequency of the leaning actuator.

15. The leaning vehicle according to claim 14,
wherein the control unit is configured to select, in addition to the first mode and the second mode, a third mode in which the leaning actuator is employed without employing the steering actuator; and
wherein the control unit is configured to select one of the first mode and the second mode based on parameters that reflects an operation frequency of the steering actuator.

* * * * *